United States Patent
Welch

(10) Patent No.: US 9,311,504 B2
(45) Date of Patent: Apr. 12, 2016

(54) ANTI-IDENTITY-THEFT METHOD AND HARDWARE DATABASE DEVICE

(71) Applicant: Ivo Welch, Los Angeles, CA (US)

(72) Inventor: Ivo Welch, Los Angeles, CA (US)

( * ) Notice: Subject to any disclaimer, the term of this patent is extended or adjusted under 35 U.S.C. 154(b) by 0 days.

(21) Appl. No.: 14/551,851

(22) Filed: Nov. 24, 2014

(65) Prior Publication Data

US 2015/0371053 A1 Dec. 24, 2015

Related U.S. Application Data

(60) Provisional application No. 62/015,819, filed on Jun. 23, 2014.

(51) Int. Cl.
*G06F 21/62* (2013.01)
*H04L 9/32* (2006.01)
*H04L 29/06* (2006.01)

(52) U.S. Cl.
CPC ........ *G06F 21/6227* (2013.01); *G06F 21/6218* (2013.01); *H04L 9/3215* (2013.01); *H04L 63/107* (2013.01); *H04L 63/18* (2013.01)

(58) Field of Classification Search
CPC ..... H04L 9/3215; H04L 63/107; H04L 63/18; G06F 21/6227
See application file for complete search history.

(56) References Cited

U.S. PATENT DOCUMENTS

| 5,745,748 | A | 4/1998 | Ahmad et al. |
|---|---|---|---|
| 6,216,183 | B1 | 4/2001 | Rawlins |
| 6,260,120 | B1 | 7/2001 | Blumenau et al. |
| 6,351,773 | B1 | 2/2002 | Fijolek et al. |
| 6,480,850 | B1 | 11/2002 | Veldhuisen |
| 6,496,822 | B2 | 12/2002 | Rosenfelt et al. |
| 6,578,037 | B1 | 6/2003 | Wong et al. |
| 6,636,929 | B1 | 10/2003 | Frantz et al. |
| 6,697,372 | B1 | 2/2004 | McAlear |
| 6,745,306 | B1 | 6/2004 | Willman et al. |
| 6,799,255 | B1 | 9/2004 | Blumenau et al. |

(Continued)

FOREIGN PATENT DOCUMENTS

| CA | 2393543 A1 | 6/2001 |
|---|---|---|
| CA | 2751787 A1 | 9/2011 |

(Continued)

OTHER PUBLICATIONS

Stallings, William; "Network Security Essentials", Fourth Edition, Prentice Hall, 2011, pp. 388-389.*

(Continued)

*Primary Examiner* — Victor Lesniewski

(57) ABSTRACT

A hardware device (TCK) for securing data in a database accessed through an Internet server is presented. The TCK controls access to its internal database through two physically separate access channels. Through at least one "unprivileged channel (port)" the TCK provides access to its individual records, one at a time, subject to stringent security provisions. Through at least one physically separate "privileged channel" not reachable by the Internet server through the unprivileged channel, the TCK provides access to administrative operations, and facilitates more complete access to the database, thus allowing, for example, retrieval or listings of stored keys and values, multi-record access, and/or the ability to run other computer programs. Thus, the TCK system can provide extra security protection for data needed by Internet servers that are utilized by multiple known and/or anonymous users.

22 Claims, 15 Drawing Sheets

(56) References Cited

U.S. PATENT DOCUMENTS

| | | | |
|---|---|---|---|
| 6,988,130 B2 | 1/2006 | Blumenau et al. | |
| 6,993,620 B2 | 1/2006 | Ferguson | |
| 7,028,133 B1 | 4/2006 | Jackson | |
| 7,036,020 B2 | 4/2006 | Thibadeau | |
| 7,051,182 B2 | 5/2006 | Blumenau et al. | |
| 7,080,189 B1 | 7/2006 | Luttmann | |
| 7,093,288 B1 | 8/2006 | Hydrie et al. | |
| 7,155,397 B2* | 12/2006 | Alexander et al. | 705/2 |
| 7,240,118 B2 | 7/2007 | Yokokura | |
| 7,413,129 B2 | 8/2008 | Fruhauf | |
| 7,433,990 B2 | 10/2008 | Wurzburg et al. | |
| 7,512,720 B2 | 3/2009 | Schultz et al. | |
| 7,523,484 B2 | 4/2009 | Lum et al. | |
| 7,640,378 B2 | 12/2009 | McLeod | |
| 7,725,558 B2 | 5/2010 | Dickenson | |
| 7,819,750 B2 | 10/2010 | Lam et al. | |
| 7,882,288 B2 | 2/2011 | Moosavi | |
| 7,898,977 B2 | 3/2011 | Roese et al. | |
| 7,945,788 B2 | 5/2011 | Roberts et al. | |
| 7,975,915 B2 | 7/2011 | Fidalgo et al. | |
| 7,979,716 B2 | 7/2011 | Fiske | |
| 8,011,013 B2 | 8/2011 | Bacastow | |
| 8,122,172 B2 | 2/2012 | Lu et al. | |
| 8,166,211 B2 | 4/2012 | Cota-Robles et al. | |
| 8,176,060 B2 | 5/2012 | Hewitt et al. | |
| 8,185,101 B1 | 5/2012 | Wiseman et al. | |
| 8,335,931 B2 | 12/2012 | Lee et al. | |
| 8,353,026 B2 | 1/2013 | Jaber et al. | |
| 8,364,870 B2 | 1/2013 | Van Antwerpen et al. | |
| 8,364,914 B2 | 1/2013 | Kottomtharayil et al. | |
| 8,386,795 B2 | 2/2013 | Lu et al. | |
| 8,402,516 B2 | 3/2013 | Weizman | |
| 8,423,466 B2 | 4/2013 | Lanc | |
| 8,428,929 B2 | 4/2013 | Sakthikumar et al. | |
| 8,473,666 B2 | 6/2013 | Cohen et al. | |
| 8,484,394 B2 | 7/2013 | Hubo et al. | |
| 8,490,126 B2 | 7/2013 | Walter et al. | |
| 8,522,008 B2 | 8/2013 | Doukhvalov et al. | |
| 8,528,096 B2 | 9/2013 | Fruhauf et al. | |
| 8,553,849 B2 | 10/2013 | Michaelis et al. | |
| 8,560,754 B2 | 10/2013 | Mueller et al. | |
| 8,560,852 B2 | 10/2013 | HongQian et al. | |
| 8,566,247 B1 | 10/2013 | Nagel | |
| 8,572,717 B2 | 10/2013 | Narayanaswamy | |
| 8,588,421 B2 | 11/2013 | Acar et al. | |
| 8,588,422 B2 | 11/2013 | Beachem et al. | |
| 8,593,971 B1 | 11/2013 | Bryant et al. | |
| 8,607,353 B2 | 12/2013 | Rippert, Jr. et al. | |
| 8,615,656 B2 | 12/2013 | Weinstein et al. | |
| 8,626,671 B2 | 1/2014 | Federgreen | |
| 8,626,932 B2 | 1/2014 | Lydon et al. | |
| 8,635,456 B2 | 1/2014 | Fascenda | |
| 8,640,206 B2 | 1/2014 | Betsch | |
| 8,650,290 B2 | 2/2014 | Dare et al. | |
| 8,654,971 B2 | 2/2014 | Orsini et al. | |
| 9,077,756 B1* | 7/2015 | FitzGerald | H04L 63/20 |
| 2002/0069178 A1* | 6/2002 | Hoffman | 705/64 |
| 2002/0184235 A1* | 12/2002 | Young et al. | 707/104.1 |
| 2003/0149874 A1 | 8/2003 | Balfanz et al. | |
| 2003/0187848 A1 | 10/2003 | Ghukasyan et al. | |
| 2003/0195904 A1* | 10/2003 | Chestnut | G06F 21/6227 |
| 2004/0019732 A1 | 1/2004 | Overtoom et al. | |
| 2005/0004924 A1* | 1/2005 | Baldwin | 707/100 |
| 2005/0027684 A1* | 2/2005 | Wang et al. | 707/2 |
| 2005/0044366 A1* | 2/2005 | Pucheral et al. | 713/172 |
| 2005/0216526 A1* | 9/2005 | Kumagai | 707/201 |
| 2005/0240712 A1 | 10/2005 | Klein | |
| 2005/0246455 A1 | 11/2005 | Bhesania et al. | |
| 2006/0168653 A1 | 7/2006 | Contrera | |
| 2006/0229886 A1* | 10/2006 | Quisenberry et al. | 705/1 |
| 2006/0282577 A1 | 12/2006 | Huang et al. | |
| 2006/0288232 A1* | 12/2006 | Ho et al. | 713/185 |
| 2007/0006290 A1 | 1/2007 | Li | |
| 2007/0245055 A1 | 10/2007 | Minami | |
| 2007/0271454 A1 | 11/2007 | Yen et al. | |
| 2008/0033921 A1* | 2/2008 | Arrouye et al. | 707/3 |
| 2008/0082681 A1* | 4/2008 | Leseberg et al. | 709/232 |
| 2008/0086452 A1* | 4/2008 | Jonas et al. | 707/3 |
| 2008/0091943 A1 | 4/2008 | Wu et al. | |
| 2009/0019223 A1* | 1/2009 | Lection | G06F 17/30147 711/115 |
| 2009/0024746 A1 | 1/2009 | Welch | |
| 2009/0037998 A1 | 2/2009 | Adhya et al. | |
| 2009/0049307 A1 | 2/2009 | Lin | |
| 2009/0177675 A1 | 7/2009 | Trumbull et al. | |
| 2009/0249014 A1* | 10/2009 | Obereiner et al. | 711/164 |
| 2009/0313280 A1* | 12/2009 | Sawaya et al. | 707/102 |
| 2010/0169071 A1 | 7/2010 | Oltuszyk et al. | |
| 2010/0199086 A1 | 8/2010 | Kuang et al. | |
| 2010/0299517 A1 | 11/2010 | Jukic et al. | |
| 2010/0312785 A1* | 12/2010 | Kliewe | 707/769 |
| 2010/0325710 A1 | 12/2010 | Etchegoyen | |
| 2011/0131190 A1 | 6/2011 | Pooley et al. | |
| 2011/0154472 A1 | 6/2011 | Anderson et al. | |
| 2012/0005720 A1 | 1/2012 | McGloin et al. | |
| 2012/0011573 A1* | 1/2012 | Menasce et al. | 726/4 |
| 2012/0059969 A1 | 3/2012 | Chou et al. | |
| 2012/0079563 A1 | 3/2012 | Green et al. | |
| 2012/0166582 A1 | 6/2012 | Binder | |
| 2012/0203671 A1* | 8/2012 | Sutter et al. | 705/27.1 |
| 2012/0227099 A1* | 9/2012 | Fawer | 726/9 |
| 2012/0324067 A1 | 12/2012 | Hari et al. | |
| 2013/0024952 A1 | 1/2013 | Sivertsen | |
| 2013/0042028 A1 | 2/2013 | Yang | |
| 2013/0067548 A1* | 3/2013 | McCray et al. | 726/7 |
| 2013/0091173 A1 | 4/2013 | Pooley et al. | |
| 2013/0104214 A1 | 4/2013 | Beck et al. | |
| 2013/0151850 A1* | 6/2013 | Bugenhagen | H04L 63/10 713/165 |
| 2013/0179610 A1 | 7/2013 | Smurthwaite et al. | |
| 2013/0198857 A1 | 8/2013 | Maier et al. | |
| 2013/0268753 A1* | 10/2013 | Vanderpol et al. | 713/155 |
| 2013/0269043 A1 | 10/2013 | Limaye et al. | |
| 2013/0290710 A1 | 10/2013 | Broder et al. | |
| 2013/0304866 A1 | 11/2013 | Wu et al. | |
| 2014/0007255 A1 | 1/2014 | Altaf et al. | |
| 2014/0149461 A1* | 5/2014 | Wijayaratne et al. | 707/785 |
| 2014/0173037 A1* | 6/2014 | Beddow | H04L 67/06 709/219 |

FOREIGN PATENT DOCUMENTS

| | | |
|---|---|---|
| CN | 101281474 B | 6/2010 |
| CN | 202904587 U | 4/2013 |
| CN | 103218716 A | 7/2013 |
| CN | 103248624 A | 8/2013 |
| CN | 103455450 A | 12/2013 |
| EP | 2136310 A1 | 12/2009 |
| EP | 2256656 A1 | 12/2010 |
| EP | 2336939 A1 | 6/2011 |
| EP | 2372565 A1 | 10/2011 |
| EP | 2507715 A2 | 10/2012 |
| WO | WO2004111959 A3 | 4/2005 |
| WO | WO2006063051 A3 | 6/2006 |
| WO | WO2006092042 A1 | 9/2006 |
| WO | WO2009052276 A3 | 6/2009 |
| WO | WO2009079708 A1 | 7/2009 |
| WO | WO2010019706 A1 | 2/2010 |
| WO | WO2011071354 A3 | 12/2011 |
| WO | WO2012106049 A1 | 4/2012 |
| WO | WO201290333 A1 | 7/2012 |
| WO | WO2014008605 A1 | 1/2014 |

OTHER PUBLICATIONS

Poger and Baker, "Secure Public Internet Access Handler (SPINACH)," Proceedings of the USENIX Symposium on Internet Technologies and Systems, Dec. 8-11, 1997, pp. 1-8.

Selinger, et al. "Access Path Selection in a Relational Database Management System," Proceedings of the 1979 ACM SIGMOD international conference on Management of data, pp. 23-34.

(56) References Cited

OTHER PUBLICATIONS

Gray, et al. "Granularity of Locks and Degrees of Consistency in a Shared Data Base," Presented at the IFIP Working Conference on Modeling of Data Base Management Systems, Freudenstadt, Germany, Dec. 1975.

Denning, et al. "Views for Multilevel Database Security," IEEE Transactions on Software Engineering, vol. SE-13, No. 2, Feb. 1987.
Blain, L "USB key adds physical element to enhance data security," website article http://www.gizmag.com/go/8099/, Sep. 28, 2007.

* cited by examiner

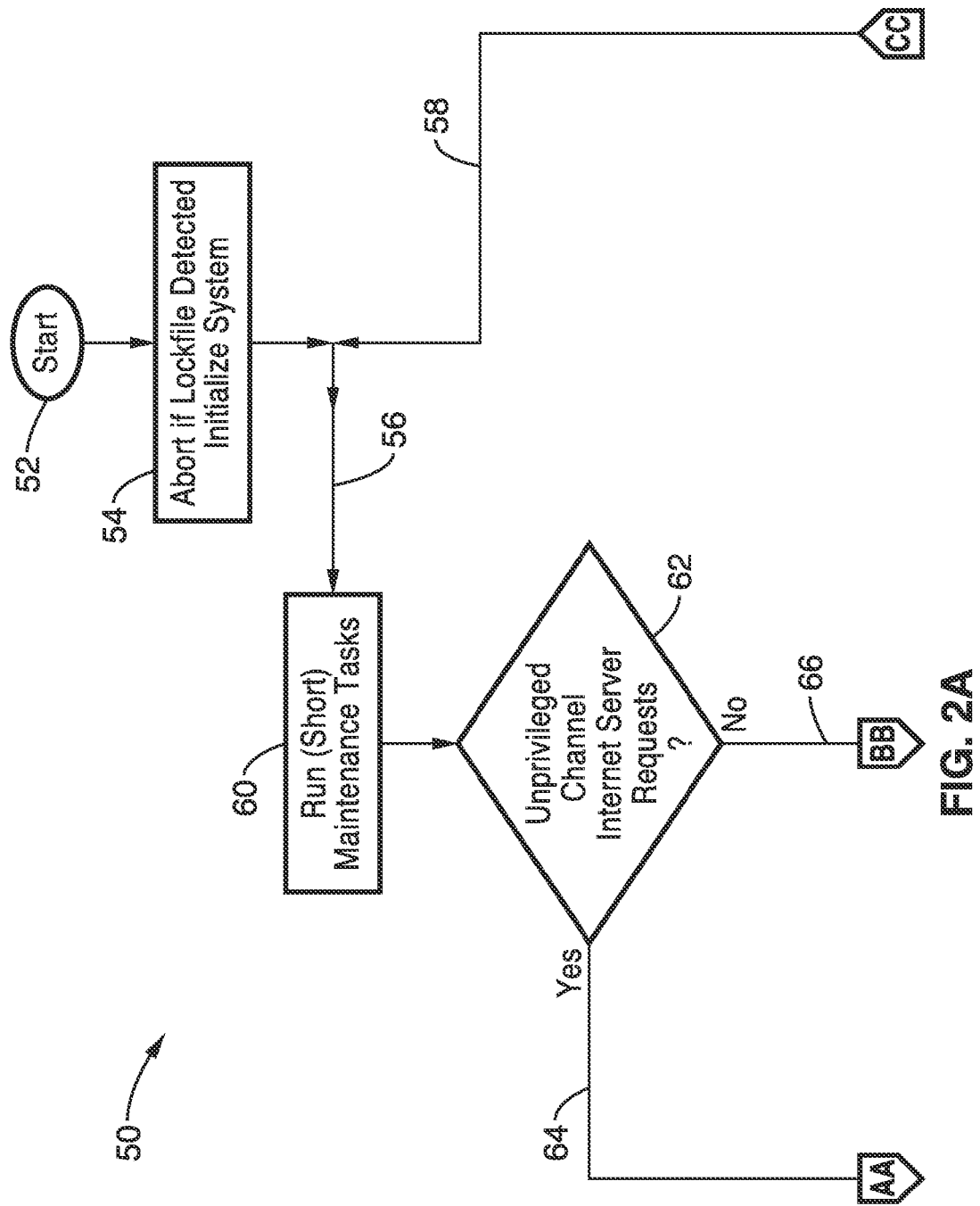

ANTI-IDENTITY-THEFT METHOD AND HARDWARE DATABASE DEVICE

CROSS-REFERENCE TO RELATED APPLICATIONS

This application claims priority to, and the benefit of, U.S. provisional patent application Ser. No. 62/015,819 filed on Jun. 23, 2014, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Appendix A referenced herein is a computer program listing in the following two text files: (1) "WEL6373.01A_allsource1.txt" created on Nov. 18, 2014 and having a 371 kb file size; and (2) "WEL6373.01Aallsource2.txt" created on Nov. 18, 2014 and having a 256 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This technical disclosure pertains generally to protecting information on Internet servers against remote data theft, and more particularly to adding data theft control hardware providing one physically separate unprivileged channel to access an underlying database in a limited way and one physically separate privileged channel to access it in an unlimited way.

2. Background Discussion

Security on the Internet represents a tradeoff between cost and functionality. With infinite resources, it may be theoretically possible to maintain, check, and audit servers such that they have no vulnerabilities and prevent all unauthorized intrusions. The practical problem is offering computer security solutions that are both sufficiently simple and cost effective for wide deployment, while offering enough functionality to accomplish the needed level of security even in the presence of malicious intruders.

Obtaining this level of security at a practical cost level has been an elusive goal. Existing common security solutions for servers on the Internet are typically quite complex. The most typical of these solutions are based on username-password authentication, and may include two-factor authentication and/or data encryption. Yet, these mechanisms are also typically executing on the server that needs to be secured in the first place. Thus, if a sophisticated remote intruder manages to obtain full access to the server, then the intruder can proceed to shut down sentries, if any, obtain all data to which the server administrative root account ("superuser") itself has access to, and intercept and/or or trick the system administrator into divulging information. It should be appreciated that a "system administrator" often refers to a physical person who can relocate the device, operate the privileged channel, or a combination thereof. However, in the above sentence and largely through the text below, this term generally refers to the superuser of the Internet connected server. Therefore, even if some of the stored data is encrypted, a (remote) intruder who can masquerade as the server superuser can often still intercept encryption passwords and/or download both many system and encrypted files, and then investigate them on a different computer at their leisure and without limits.

The difficulty of achieving and maintaining secure computer systems at reasonable cost has been demonstrated by recent highly publicized massive-scale server compromises, such as those perpetrated at Target, eBay, PF Changs, JP Morgan and others. It is notable that PF Changs even returned to the use of credit card imprinting to avoid the possibility of computer storage being compromised. Even if careful curation of servers and their attached computer networks may have prevented these break-ins in the first place, such efforts apparently had too high a cost or human overhead to maintain, despite these entities being large corporations with ample information technology (IT) resources and sophisticated administrators. It is not surprising then that these problems are especially poignant at smaller companies, in which ordinary system administrators are often overwhelmed by the necessity of constant vigilance, maintenance, and security. A secure system at one moment in time can easily become compromised when a new vendor release or bug fix is made available, or when new user functionality is implemented, or simply because security walls were inadvertently opened for even a brief period. Security is only as good as the weakest link.

The security dilemma in modern systems is made all the more difficult by the complexity of modern operating systems. The typical Microsoft Windows, Apple OSX, or Linux operating systems contain between 50 million (Windows Server 2003) and 400 million (Debian 7) lines of code. Recent Linux kernels alone already consist of about 16 million lines of code in about 16,000 files. However, complexity is just one of many contributing factors, as even programs with short source code (especially security-related complex and "clever" code), is not immune from coding errors that can compromise existing well-maintained servers, as recently shown by the "heart-bleed" bug. There is wide agreement that high complexity is a significant contributing factor to computer vulnerability. Ultimately, a robust security solution is only possible with reasonably low complexity. It has to be simple, or it is likely to fail eventually.

Encryption is often used to help address the problem, but this provides a poor solution for at least two reasons. First, the hacker may intercept the encryption keys. Second, the owners may forget the encryption keys and thereby lose access to their own records.

In view of the above, what is needed is a mechanism to prevent wholesale data theft over the Internet by remote attackers that is economically practical, low in complexity, and simple to maintain even by relatively unsophisticated server administrators.

Accordingly, the present disclosure describes a system which overcomes the shortcomings of these prior approaches for securing an Internet accessed database which can be practically implemented at a low cost and complexity.

BRIEF SUMMARY

The technology described herein provides security protection for Internet servers that are used by multiple known and/or anonymous users. Database security is enhanced for the Internet server, as the database is retained on a separate processing device connected to the Internet-facing server. This device is referred to as "The Castle Keep" (TCK) device, a reference to an additional layer of "last-resort protection" in medieval castles. The TCK device provides a fast and compact database. A key-value data base is sufficient. TCK can also provide extra code and access protection, alert the server owners to hack attempts, and protect records when under attack.

This technology provides a number of benefits: (a) it retains sufficient functionality so that Internet server owners should prefer to use it and not to avoid it; (b) it is affordable in both initial cost and ongoing maintenance to be practical even with small server installations; (c) it is easy to use, administer, and maintain, even by unsophisticated server personnel; (d) it is difficult to compromise accidentally; and (e) it has sufficiently low complexity in its user-facing implementation to facilitate complete code audits with reasonable certainty that there are few to no hidden vulnerabilities.

A security solution providing the above benefits could have significant positive impact on Internet-driven activities. This should not be surprising, because security compromises on the Internet can spread like infectious diseases, because servers are often linked through networks which require a degree of trust among servers, and because Internet users often reuse the same password on different servers (or accidentally type them at the wrong computer). A reduction of vulnerability of information on any one server on the Internet can thus reduce the probability of breaches into other servers on the Internet. Every server on the Internet that is compromised creates additional security risks for other not-yet-compromised servers on the Internet. An improved mechanism to protect identity information—even if it were a partial one—would thus bolster "herd immunity." From a global economic perspective, there is a "free-rider problem," as each system owner does not invest enough money in costly protection thus ignoring the benefits that their own security improvements convey on other system owners. This makes it all the more important from a social perspective to provide cost effective and simple data and identity theft protection.

The TCK technology presented is an anti-identity-theft hardware device running an internal database which divides access through physically separate "unprivileged" and "privileged" channels (ports). The unprivileged TCK port can be accessed (is reachable) by the Internet-facing server. It is reachable while the server is running (e.g., high-availability) but provides only limited database single-record access. The privileged administrative TCK channel is not reachable (accessible) by, or through, the Internet-facing server. It provides multiple-record access and other functionalities required for administering and maintaining the internal database. Unlike the unprivileged channel, access over the privileged channel is typically rare, and in some implementations could be inconvenient, such as for example requiring physical local interaction with the TCK device itself.

The new paradigm utilized in the presented security device renders certain access restrictions more useful and others less useful (e.g., including user-id-password authentication and encryption). The common database language protocol structured query language (SQL) is not suitable for use on this device as the server-device communication scheme: (a) because it does not implement the different security schemes that are particularly useful; (b) because it has greater complexity which increases vulnerability; (c) because it provides protection based upon user-id-password authentication and not by channel; and (d) because it has wildcard functionality as one of its standard features.

The hardware device referred to herein as "The Castle Keep" (TCK) device implements a controller to maintain an internal database in its own associated (non-volatile) storage. The device has one unprivileged port (e.g., a universal serial bus (USB) port) over which the to-be-protected Internet server can store and delete individual records; and request individual single records (upon presenting a correct key), but no more general database operations can be performed over this channel. Specifically, on this physical unprivileged channel, there are no wildcard and multiple-record database operations possible, and it is not possible to retrieve a list of keys and values. The TCK device user (i.e., the connected website server) must already know and provide a correct key in order to retrieve information about a record.

Although the existence of the unprivileged channel is an essential aspect of the system, it provides insufficient functionality for maintaining and administering the database. Thus, a second necessary condition is that the device supports the privileged administrative channel that is physically separate and not accessible from the same Internet server. This channel need not be a port, as it can be implemented to require physical relocation of the TCK device. Note that in this system, the administrator who can interact with the TCK device on the privileged channel, can always retrieve information that is secret to the server. Thus, an encryption key stored on the TCK device can always be retrieved. It remains inaccessible to the Internet server, yet not to the physically-present administrator. A user who has forgotten their encryption key cannot retrieve it over the server, but can ask the TCK administrator to recover it.

Even a fully-privileged and fully-informed superuser on the Internet server has no access to the privileged channel. Therefore the server superuser cannot obtain further (e.g., multiple-record or wildcard-based) access to the data stored on the TCK device through the only access available to the server, i.e., the unprivileged connected channel; and therefore, neither can a remote intruder.

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

FIG. 2A and FIG. 2B are a flow diagram of process flow for the TCK device according to an embodiment of the present disclosure.

DETAILED DESCRIPTION

The anti-identity theft system of the present disclosure is referred to as "The Castle Keep" system, which for the sake of simplicity will be referred to as TCK.

Figure 1:
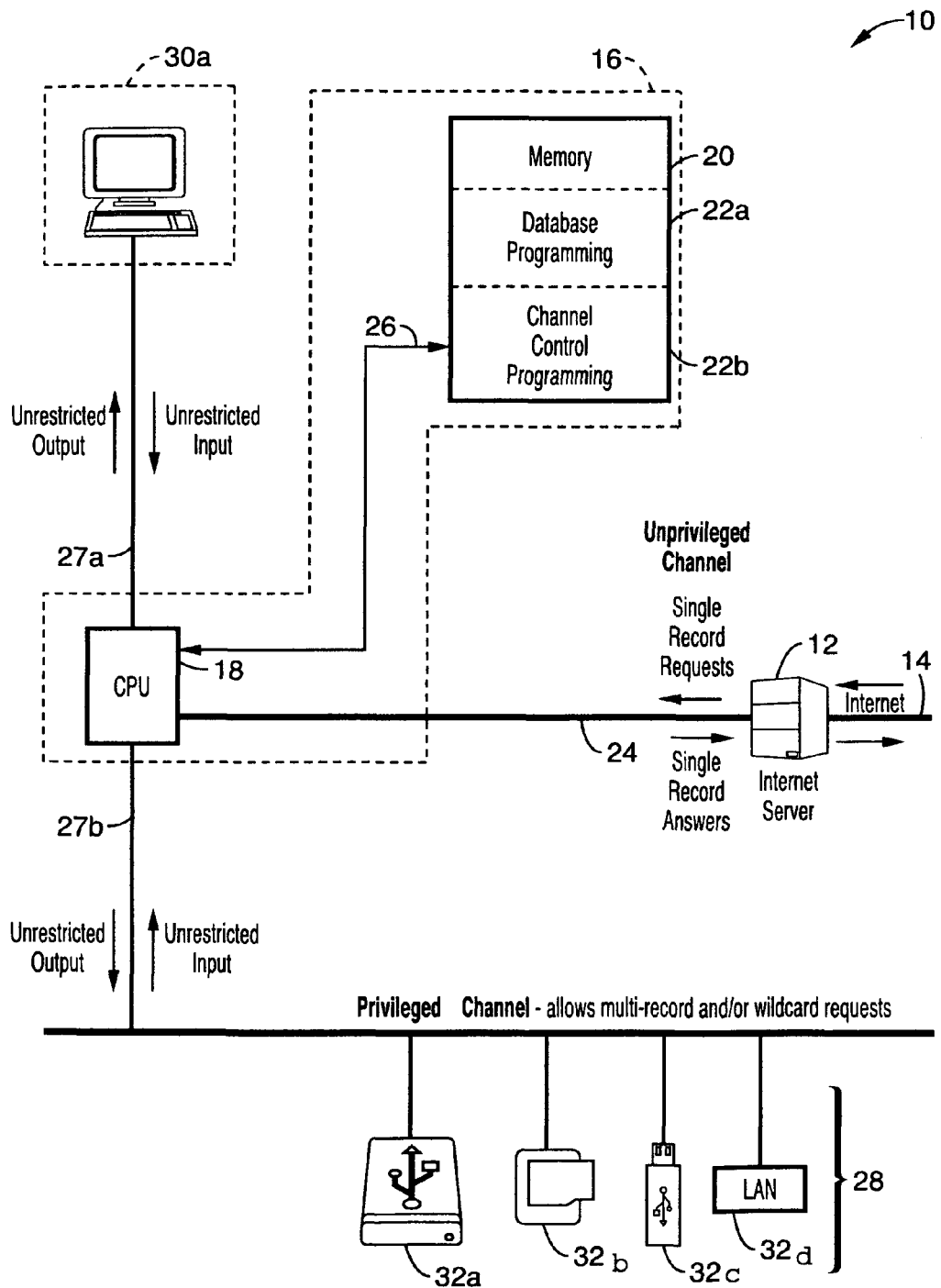
FIG. 1 is a block diagram of a server system incorporating the TCK device according to an embodiment of the present disclosure.

FIG. 1 illustrates an example embodiment of a general TCK system 10, in which an Internet server 12 is coupled to the Internet 14, and to a TCK hardware device 16 having at least one computer processor 18, coupled through connection 26 to a memory 20, which is shown configured for containing at least database programming 22a and channel control programming 22b. It will be appreciated that memory 20 may comprise any of a number of types, or combinations, such as fixed memory, removable memory, non-volatile memory, solid state disks, memory sticks, memory cards, removable media, and combinations thereof. It should also be appreciated that the data for the database which is being maintained, may reside in the TCK, or be externally connected 28 (e.g., board, card, stick, disk drive, other external memory device types and combinations thereof) to the TCK, or a combination of internal and external storage.

TCK device 16 has an unprivileged channel 24 to the Internet server 12, and also is configured with a privileged channel, exemplified as comprising one or more of a connection 27a to a control console 30a (e.g., monitor, keyboard, mouse/touchscreen or other pointing device), or connection 27b to removable devices 28. Channel programming 22b in the TCK controls unprivileged channel communication 24, and also preferably controls the privileged channel 27a, 27b.

TCK programming is configured to only allow single record requests and single record answers over unprivileged channel 24. It can allow unrestricted input and output over the privileged channel 27a, 27b, including fulfilling both multiple-record requests and wildcard requests, but providing no direct access from the Internet server to the database maintained by TCK device 16. Instead of working through the TCK controller, privileged channel communications can also be configured to require relocation of the TCK device, or its storage (e.g., database) for access by a different computer.

Privileged channel 27b from the TCK hardware device 16 is shown coupled to one or more communications or data containing devices 28, shown by way of example and not limitation as a one or more data storage devices (e.g., disk drive 32a, memory card 32b, FLASH drive 32c) which are preferably removable, and/or communication devices, such as connectivity to a non-public network 32d, such as a local area network. It will be appreciated that communication devices, such as LAN 30d should not provide any readily accessible communication path back to the Internet.

In one embodiment, the device hardware comprises three main elements or characteristics. (1) The TCK device hardware provides a communication channel or port to facilitate plain-channel unprivileged access, for example a USB client port connected to the USB host port of the Internet-attached server. (2) External storage of the database, such as on an SD card, is attached to the TCK device hardware, and can be relocated to a different non-Internet connected computer whenever privileged administrative channel access is needed. (3) The special-purpose controller software running on the TCK device implements a database that runs on the device and handles communications with the Internet server, effectively transforming the device from a general-purpose computer into a special-purpose controller that facilitates only carefully controlled single-record communication between the server and the device over the plain (USB) channel.

An example of a C database program is found in Appendix A hereto.

In this exemplary embodiment, the device is connected to the Internet server as a USB device in normal web operation. To access the full database for maintenance or backup, the server operator must shut down the USB device (and thus most likely the server, too), and physically move the SD card to a (different) computer, preferably one that never has been and never will be connected to the Internet. Although not impossible, the physical relocation requirement makes it more likely that the person operating the Internet server will not accidentally expose the data to the Internet-exposed, and thus possibly compromised, server.

General-purpose device hardware that can be modified for use as the TCK device of the present disclosure is readily available. In one embodiment, the device has been prototyped on a Beaglebone™ AM335x (ARM Cortex-A8) development platform, with 512 MB of RAM, 4 GB of 8-bit eMMC, a client USB port, and an SD card slot. In its normal operation, the Beaglebone is a general-purpose computer that can run a standard Linux™ distribution. It has a local high-definition multimedia interface (HDMI) host port that can be used for some or all administrative privileged TCK channel functionality. The Beaglebone also possesses a second USB host port, which can be used to connect a keyboard, mouse, or further USB storage. Thus, a USB keyboard and mouse, together with the aforementioned Beaglebone's HDMI output, can be used to implement a console to obtain some or all administrative-privileged TCK channel access. Unless otherwise specified below, the Beaglebone USB port described in the main text always refers to the Beaglebone client port that communicates with the Internet-facing server's USB host port.

The hardware selected for the described embodiment is sufficiently flexible in its generic programming facilities to be fully transformable into the special-purpose device described in this disclosure, although other embodiments may utilize other general purpose computing devices/elements or alternative special-purpose hardware. In the described embodiment the base software utilized in ordinary operation may comprise a standard version of Linux. However, it is necessary in order to implement the TCK system that the usual Linux access becomes invisible to, and unavailable over, the unprivileged communication channel. That is to say, that it must no longer be possible to log into the underlying Beaglebone Linux operating system from the unprivileged USB client port. Instead, the Beaglebone USB client port has to be taken over (replaced) by custom TCK software control. For convenience, the TCK device can be built on top of an existing Linux distribution, but this is not required. Indeed, the Linux base may be removed in future implementations altogether.

Accordingly, the TCK device provides a physical separation of unprivileged and privileged access channels, and requires each of the following. (1) A hardware device with its own processor, memory, storage and communication channels is required in the TCK. It should be recognized that a software-only implementation of the TCK on an Internet server is insufficient. (2) Programming is required for the TCK device which includes database programming. The programming is configured to distinguish between access from an unprivileged and a privileged channel which are physically distinct. The programming thus serves only single-record information over the unprivileged channel. It should be noted that a device with software that allows full data base information, such as the key browsing or wildcard retrievals is insufficient for the unprivileged channel. (3) An unprivileged high-availability high-speed communication channel (e.g., over a universal serial bus (USB), Ethernet, Intel Thunderbolt Bus™, peripheral component interconnect (PCI), or other digital communications links between the device and the Internet-facing server) is required for the TCK to communicate to an Internet server. (4) A privileged channel (e.g., through data removal or console access) is required to access the database data associated with the TCK device without the single record limitations. This channel need not be a standard computer port, but can require the physical relocation of the device or its storage.

The technology described herein is a dedicated database hardware device, TCK device that stores sensitive data, with its own database storage. In at least one embodiment, the database storage of the TCK can be physically removed, and thus no longer be an integral part of the Internet-exposed server. Unlike a general-purpose computer, the TCK hardware device does not allow general purpose access, for example that of logging-in as a user or executing user programs over its unprivileged channel (i.e., in standard operation). Instead, although the TCK hardware can be implemented and prototyped on a general purpose computer, the device preferably recognizes (understands) only a very limited protocol and presents a hardware controller to the Internet-facing server that behaves in the manner of a "fixed-function controller" device rather than a general-purpose computer. It should be appreciated that in recent times, the majority of embedded/dedicated functionality electronic devices are implemented on general purpose computer hardware configured with embedded/dedicated programming. This includes almost all device controllers, such as storage and network controllers, network routers, locked tablets, kiosks, ATMs, cable modems, TV cable boxes, video game boxes, and so forth.

The protocol for normal access by and from the server, over the unprivileged channel of the TCK, is limited to permit single-record access for all users on the Internet server, including the server superuser. Thus, even a full remote compromise of the server does not render it possible to query the database device for multiple records. It should be appreciated that because even the server superuser cannot query the database device for multiple records and because even the server superuser cannot run other programs without physical access to the privileged channel of the TCK device, a remote intruder is similarly prevented from these accesses.

The above attributes of the TCK device in its associated Internet server system would in themselves protect against wholesale theft of data. The system needs to provide additional attributes for the intended-use scenario. In particular, the second physical channel access is provided to the TCK device to facilitate database maintenance, including database backups or full user listings, which can be performed at the full database level. This second physical hardware access channel is not available to the Internet or Internet-facing servers. Administrative privileged access to more than single records of the database and/or arbitrary execution of code can occur only by accessing the database through this second physical channel.

The technology distinguishes itself over systems that attempt to provide administrative privileged access from the same Internet-facing server that requests individual records over a plain (unprivileged) access channel in its ordinary course of operation. Instead, the TCK technology is configured to provide physical access channel separation between its limited single-record access (i.e., no multiple-record, wildcard access, or program execution) over the Internet-server facing frequent-access high-availability unprivileged TCK communication port (channel), while providing unrestricted full access over the administrative privileged TCK channel. It should be appreciated that a port and a channel are not identical, as a port is usually connected, such as a USB link, while a channel can be connected, but does not need to be connected. It will be recognized that access to the database associated with the TCK device can be obtained by moving the device or its storage to another location.

It should be appreciated that the TCK device can be implemented with a low code complexity that for example, may be measured in thousands of lines of computer code, and not millions of lines of computer code. It should be considered that if TCK code were as complex as found in general-purpose computing systems, then inadvertent code vulnerabilities would be far more likely to lead to security breaches. Any high-complexity device can itself become another point of vulnerability, in the same manner in which general-purpose computers on networks can become vulnerable. The security of the disclosed TCK system is thus enhanced by the special-purpose fixed-function controller-like lower-complexity nature of the hardware device that serves up a database.

The protection provided by the TCK device is particularly adept at protecting records that were stored before an intrusion and not (fully) accessed by users on the server thereafter. It will be recognized that a sophisticated intruder with unlimited full control over the Internet server could trick clients and administrators into running other programs, monitor all communications, and intercept and store individual record requests in their own database. Because TCK does not control the server, it cannot protect against this. The TCK device can only protect the data stored on its own device. A potential server security breach has extended ramifications on TCK security that are analogous to the ramifications of a breach of the username-password security paradigm through social engineering.

Another useful element of the technology is that an intruder cannot disable the device sentries, because there is no ability to log into and control the actions of the device over the unprivileged channel. Attempts to perform such actions are detected by the TCK device, which in response can generate audible or visible alerts on the TCK hardware and/or an alert indicia on a TCK display console.

Another useful element of the technology is that it does not rely primarily on encryption keys that can either be guessed (or accidentally disclosed), intercepted, or lost. Lost passwords can render data unusable the administrator. In contrast, a TCK owner can always gain back complete access to the keys and values through access over the physical privileged administrative channel.

Another useful aspect of the technology from the perspective of the Internet server programmer is that the TCK device or parts (some files) of it can be switched into a read-only mode (e.g., to maintain checksums of programs that are consulted before the host OS server runs them) or to a write-only mode (e.g., to store past credit card transactions), with further access only permitted through the privileged channel.

Another useful aspect of the device is that the TCK hardware and protocol can display and provide verification of a time-varying random password (or other key information) displayed on the TCK console, thus requiring physical proximity to the TCK device to log into the server. Another useful aspect of the device is that the TCK hardware can provide further control over a hard disk attached to the server. For example, it can switch one hard disk from read-write mode into read-only mode in a way that the server itself cannot change.

Because the information no longer resides on the web (Internet) server and because access is so limited, challenge-response or token security measures can be replaced with a much simpler access restriction upon record insertion, such as utilizing (external) limits on the number of access attempts. For example, it is known that password files are vulnerable when they can be downloaded and then later cracked at will. Once encrypted passwords are downloaded, there are no external limits to the number of password cracking attempts that can be tested. However, because TCK can limit the number of attempts to guess the password, it usually is impossible to guess correctly before the limit is reached. The analogy holds here, because in at least one embodiment, the TCK device keeps track of the number of intrusion attempts and shuts down further attempts upon detecting that a threshold number of attempts have been reached.

Although it would seem tempting to combine external limits with challenge-response, encryption, or token technology for stronger protection even after the server has been compromised, this is rarely useful. For example, even though it is possible to encrypt the communication so that only the TCK device and the client browser, but not the web server, can decrypt the information, it is not clear why a web client should ever transmit secrets to a web server in the first place if the web server does not need these secrets. After all, the web server should itself receive only information that it requires for its functionality. In this sense, the web server is fundamentally different from a "man-in-the-middle" information capture on the Internet. A man-in-the-middle does not have to provide the functionality that made disgorging secrets important in the first place. The client can itself encrypt and decrypt information that the server does not need to know in clear text.

Although the TCK device could be useful in the context of a non-network connected server, such as a kiosk computer that is shared among persons passing by, its principal use is to protect against remote breaches on Internet-connected servers, (e.g., single, multiple servers, or servers in combination).

In at least one embodiment, the TCK device itself, its keys, its partial keys, or its values, are hashed or encrypted. This can be useful, e.g., to provide protection against non-remote local physical compromise.

In addition, the value fields of the individual records can also serve as encryption devices for files stored by the Internet server host on the server storage devices. Thus, the system can be configured so that each user or file has an extra encryption layer protected by the TCK device. The user-specific or file-specific encryption passwords could thus be inaccessible to the superuser of the Internet host server, yet still be accessible to the administrator with physical access to the device and therefore recoverable in case of emergency (without requiring storage on the user web client). Common encryption suffers from lack of recoverability when the password is lost.

Figure 2B:
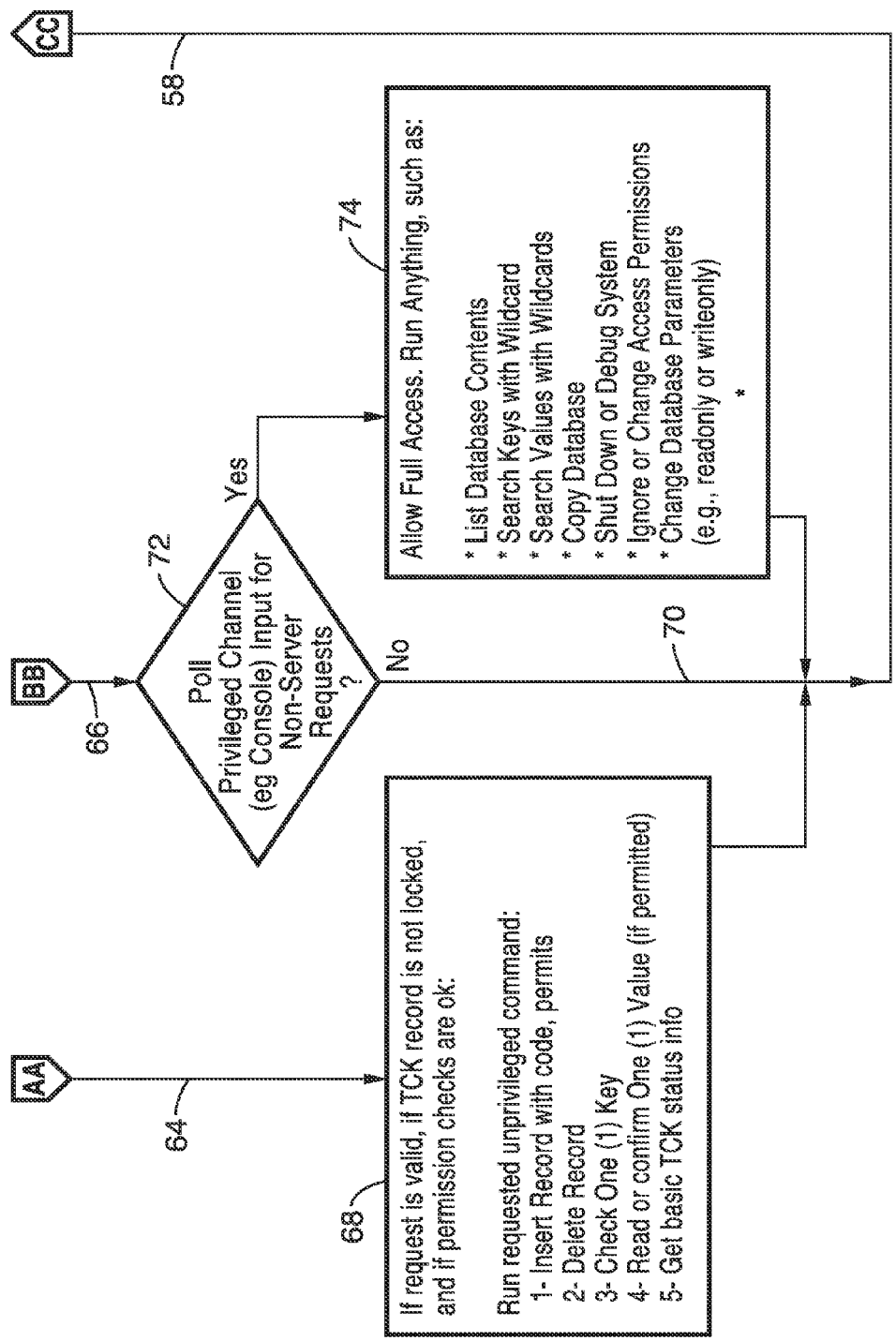

FIG. 2A and FIG. 2B illustrate an example embodiment 50 of generalized process flow for the TCK hardware of FIG. 1. Upon being started 52 in FIG. 2A, a check is made and initialization aborted if the lockfile flag is set, which indicates that too many global bad access attempts were made on the TCK during its previous operation. In at least one implementation, a physical presence and intervention is required by the TCK administrator to determine the cause, and afterward to reset the lockfile flag. Otherwise the system is initialized 54 and execution follows along path 56 to enter a main loop at block 60, in which short maintenance tasks are first executed followed by checking for unprivileged channel requests 62 and privileged channel requests 66. If an unprivileged channel request is detected at block 62, then execution path 64 is taken to block 68 (in FIG. 2B) at which, if the request is valid, the TCK record is not locked, and permission checks pass, then the requested command is executed.

In the prototype implementation, when a new record is inserted, the client can request additional protection, in the form of "permits," which cannot be changed later over the unprivileged channel. The user can set access permit codes for each record upon insertion that will be required for all later access: (a) a keycode is an integer that is required to be known by any client who wants to check whether the record exists; (b) a valcode is an integer required to be known by any client who wants to access the record's value; and (c) a delcode which is an integer required by any client who wants to delete (or overwrite) a record. In the prototype implementation, records cannot be updated. They can be read, deleted, and written anew. This access is by nature always atomic and does not suffer the complications of simultaneous access by multiple processes. The Internet server cannot request upgrading the permission of a stored record later on over the TCK unprivileged channel. This is to avoid allowing a compromised server to gain access to data, which was not intended when the data was originally stored before the remote compromise arose.

The requests which can be performed through the unprivileged channel preferably comprise a simple limited set of operations, preferably constituting: (1) Insert record with code and permits; (2) delete record; (3) check the existence of one key; (4) read or confirm one value given a key; and (5) getting basic TCK status information. It should be noted that permit codes are provided upon record insertion to restrict subsequent permissions, such as to access keys and values and to perform deletions. After performing the command, execution returns 58 to FIG. 2A at the top of the loop to again run 60 any maintenance tasks. If block 62 does not detect an unprivileged request, then execution moves 66 to block 72 in FIG. 2B to check for privileged channel requests. If a privileged channel request is detected, then execution commences at block 74 in which full access is allowed to run any desired combination of operations, selected from but not necessarily limited to: (1) listing database contents; (2) searching keys with wildcards; (3) searching values with wildcards; (4) database copying and backup; (5) debugging or shutting down the system; (6) ignoring access permissions; (7) changing database parameters (e.g., making it read only or write only); (8) logging into the underlying TCK Linux operating system, and so forth. Upon executing this privileged command, execution returns 58 to FIG. 2A at the top of the loop to again run 60 any maintenance tasks.

If there are no privileged channel requests at block 72 in FIG. 2B, then execution proceeds 70 to 58 back to the main loop at block 60 in FIG. 2A. The above is but one example of how privileged and unprivileged requests may be handled by the TCK device, one of ordinary skill in the art will appreciate that the program may be varied in a number of ways without departing from the present disclosure, for example using a different ordering of steps, using event driven execution (e.g., interrupts), task driven execution (e.g., multi-tasking kernel), as well as other programming structures and combinations thereof.

Figure 3:
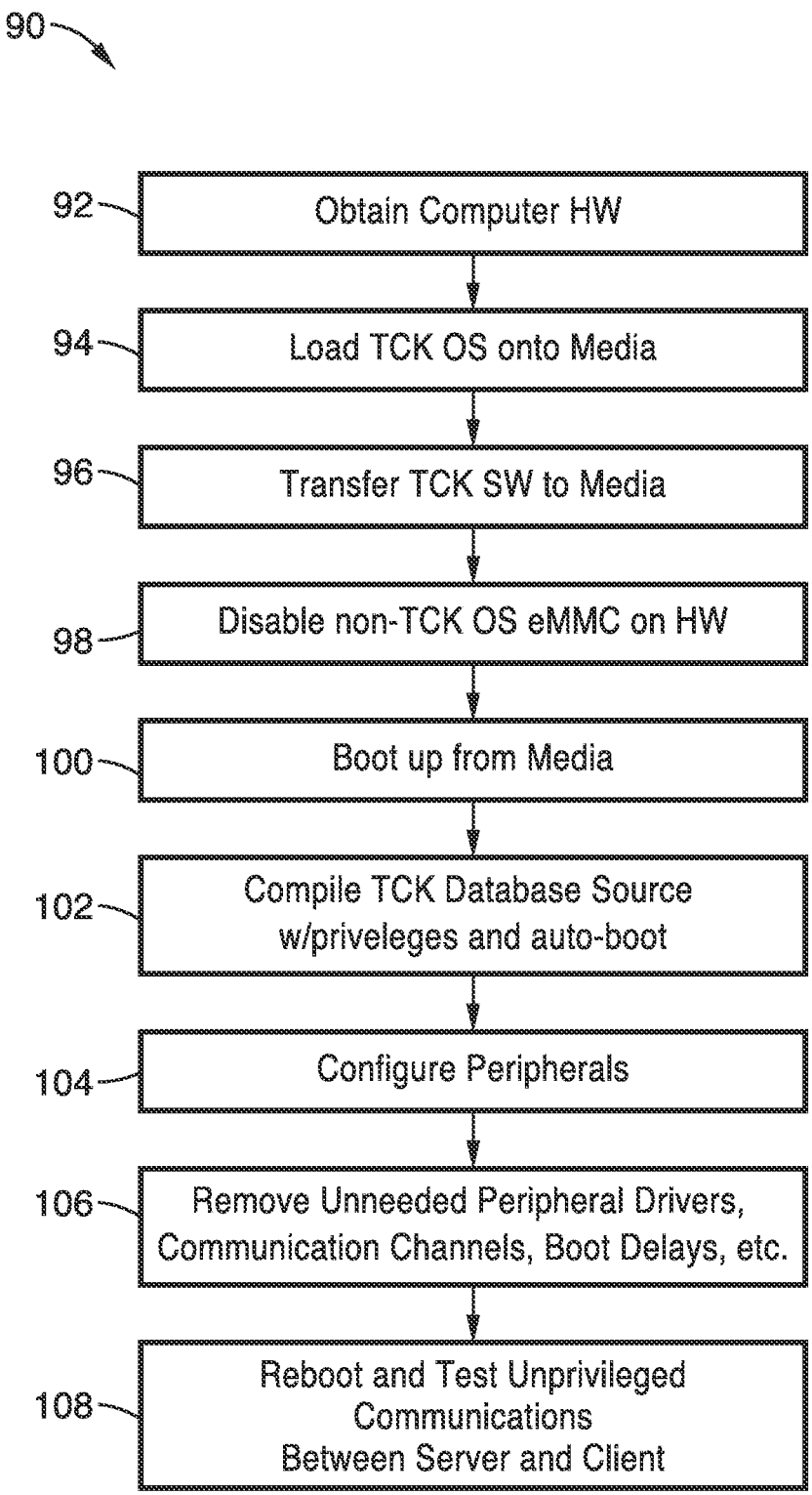
FIG. 3 is a flow diagram of configuring a general purpose computing device as the TCK device according to an embodiment of the present disclosure.

FIG. 3 illustrates an example embodiment 90 of a process for configuring a general purpose computing device, such as the TCK device. Computer hardware (HW) is obtained 92 upon which to run the TCK system. An operating system (OS), such as Linux, is then loaded 94 unto a media configured for being read as a boot media by the computer HW. Software (SW) for the TCK database controller and related auxiliaries is also transferred 96 to the media. In the case of the BBB, the embedded multi-media controller (eMMC) can be disabled 98 on the computer hardware (HW), after which the TCK-tailored Linux OS is booted up 100 from the media. The TCK data base controller software source is then compiled 102 on the computer (over the privileged full-access TCK channel) and auto-booting into the TCK data base controller software is enabled. Needed peripherals are configured 104, such as an annunciator (e.g., buzzer); while unnecessary peripheral, communication, and other unneeded programming is removed 106. The removal of these unneeded programming elements not only speeds the boot process, but makes the TCK device more robust. The computer device, now a TCK device, is then rebooted 108 and its communications tested.

Figure 4:
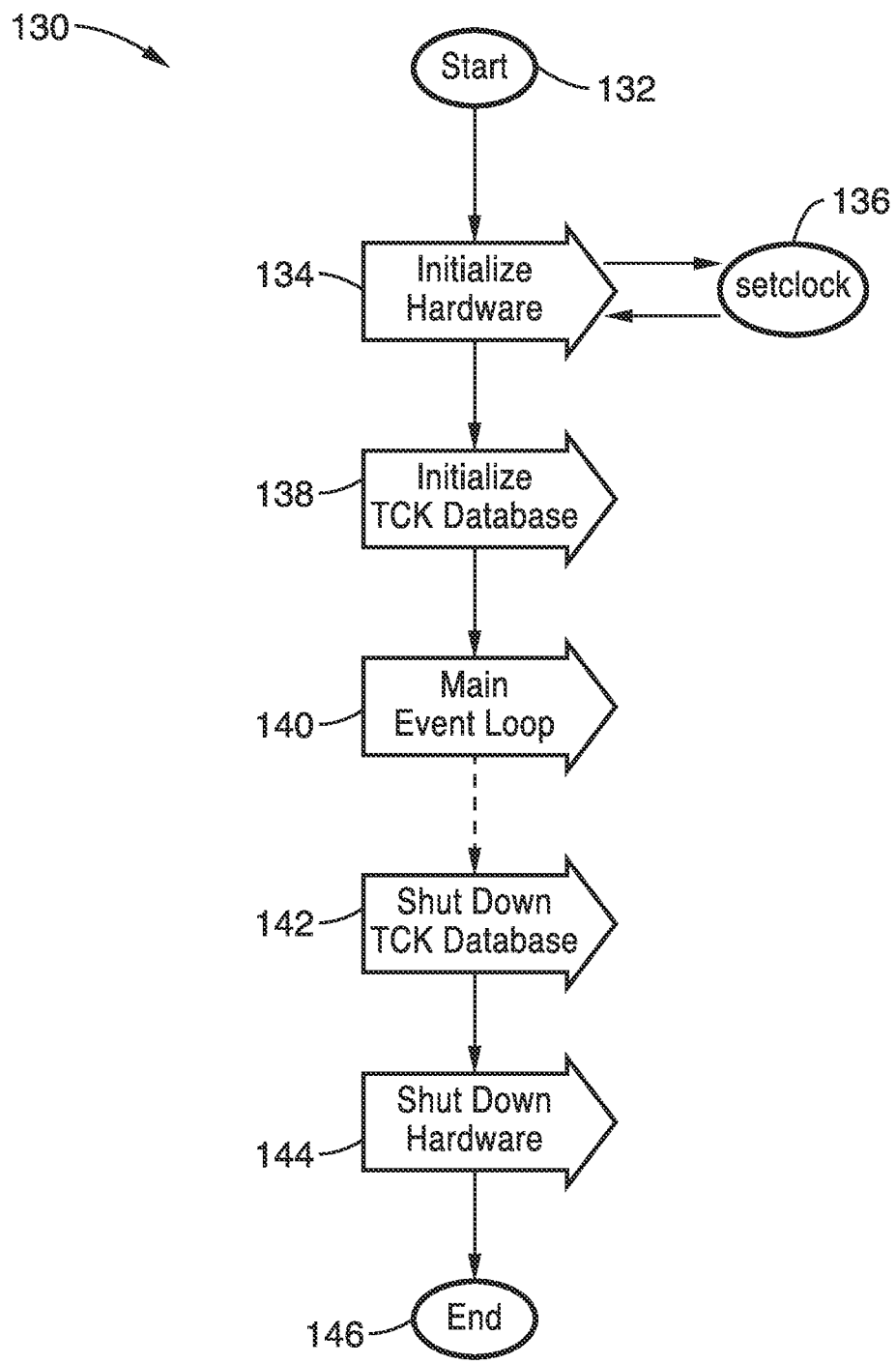
FIG. 4 is a flow diagram of TCK hardware operation from initialization to a main operation loop, through shutdown, according to an embodiment of the present disclosure.

FIG. 4 illustrates a simple process flow 130 for operation of the TCK device programming. Execution on the TCK device is started 132, such as at boot. After booting, hardware is initialized 134, including setting of a clock 136. It will be appreciated that the clock is preferably a real time clock, or otherwise utilizing a clock count that can be rendered into a real time value for associating logged events with real world activity, such as particular (compromised) activity arising on associated Internet-facing servers. The TCK database is then initialized 138 prior to entry of the main execution loop 140. The main loop performs general TCK processing for handling commands and data operations, such as in a program loop, on both the privileged channel and unprivileged channel. When a shutdown request is received, the TCK database is shutdown 142 by clearing up (e.g., completing or denying) any open requests, and assuring database consistency, after which the hardware is shut down 144, prior to program end 146. It should be appreciated that for the sake of simplicity of illustration the figure does not depict any interrupt structure, as may be utilized if desired for rapidly servicing the timer, I/O and data accesses.

In one example embodiment, a Beaglebone Black™ (BBB) device is utilized as the computer hardware with Ubunto® Linux as the operating system, although it will be recognized that a wide range of computer devices and small operating systems may be similarly utilized without departing from the teachings herein.

In the prototype embodiment, the ordinary high-level USB driver for the USB client port can be uninstalled from the Linux operating system of the TCK device, to leave only the lower-level USB driver. The higher-level USB driver in the standard Linux distribution is set to allow multiplexing (sharing) the USB port to provide general network access, storage access, and login access, which would disqualify the device from acting as a TCK device. The low-level driver is put into a special-purpose USB "gadget" driver mode which facilitates sending packets of data to and from the computer to the device. Upon boot, the Beaglebone-internal Linux operating system then connects the client USB port gadget driver to the dedicated database software, comprising an executable program such as that compiled from C source code in Appendix A hereto. The Internet server then communicates with the TCK USB client port through the server USB host port, preferably utilizing a limited-vocabulary protocol.

Special-purpose database software installed on the computer device (e.g., BeagleBone) transforms it from a general-purpose computer into the TCK device of the presented technology. The source code (and Ubuntu operating system) is invisible from the perspective of the client program executing on the Internet-facing server. It is described here to explain how the technology of this disclosure is actually implemented.

This special purpose database software is preferably kept reasonably short (e.g., about 2,000 lines of ANSI C code and 500 lines of H definitions) and fully documented to make testing and replication straightforward, while keeping the implementation robust. Inspection of the code shows that it is possible to achieve the desirable low code complexity. The code is preferably positioned (executed) just above the kernel layer in user space, and is of sufficiently low complexity to be readily made completely secure.

To build the program, the code can be compiled and linked on the BBB itself to arrive at a main TCK executable (called the TCKrunner-BBB program). Upon power-on, the device boots and passes control to the TCKrunner-BBB. In the case of using the Beagleboard device, which does not have an internal clock, the current time is passed over the client USB board in this boot up process. In other implementations, a hardware clock may already exist or be installed, and only time synchronization is required. The main TCK executable (e.g., TCKrunner-BBB program) is configured to detect (e.g., wait and "listen" for) (character) data from the Internet server sent to the USB client port it controls, to decode server requests, to dispatch it to the relevant function in the TCK internal API, and to return its responses over the USB back to the server.

An embodiment of the code and architecture are set forth in Appendix A hereto.

It is generally preferred that coding clarity be given priority over speed, even if modest inefficiencies arise (e.g., the intervening NULLs and the rebuilding and rechecking of the RAM index), for the sake of clarity and security. The simple coding can also be readily understood by one of ordinary skill in the art within a short time-span. The database software is preferably configured to follow well-known data storage concepts. It will be appreciated that both the access restrictions (i.e., permissions upon record insertion) and the access limitations (i.e., no wildcard or sequential access over the USB channel) are unusual, and are utilized interoperably with the hardware configuration having separation of its limited unprivileged access channel from its unlimited administrative privileged channel that distinguishes over prior art secure server attempts. Although it would be possible for a TCK device to have several unprivileged channels, each possibly with its own permit codes and thus requiring modified software.

The following describes at least one embodiment for implementing an unprivileged device communication protocol with the server. This example embodiment utilizes a key-value database that understands only a command line request vocabulary of less than 10 commands, herein exemplified with five (5) main input commands (insert, delete, key-request, value-request, status) and four protocol input-class designators (the line contains a command [with options], a key, a value, or is waiting to request an answer). This low number of commands is an intentional element of the present system toward keeping a low system complexity. This is a protocol API-like interaction, not a graphical implementation.

Figure 5:
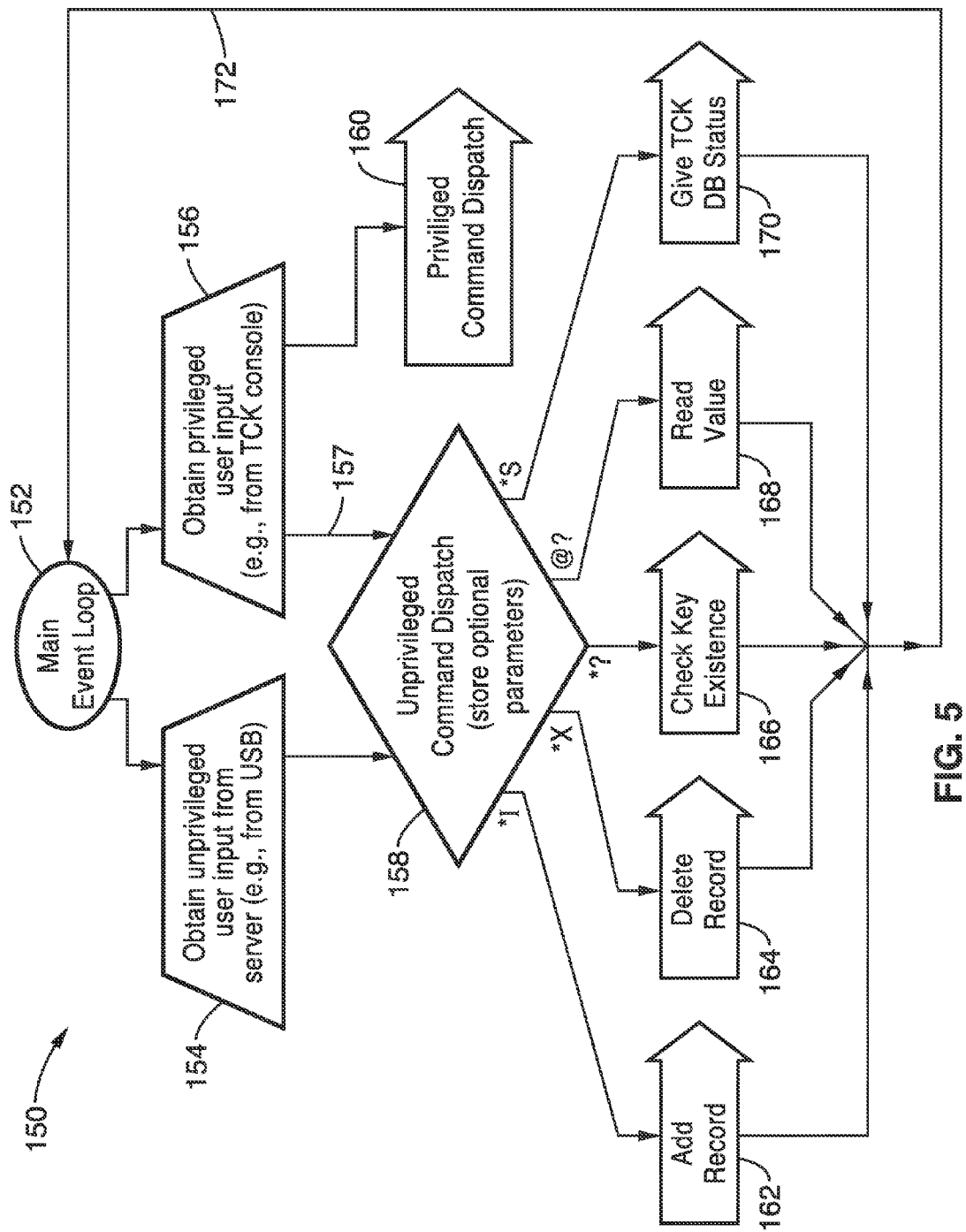
FIG. 5 is a flow diagram of a main loop in the TCK device for receiving and parsing inputs on the unprivileged and privileged channel according to an embodiment of the present disclosure.

The class of input from the Internet server to the device is designated by the first character on each line:
- '*' (star) server is sending a command from the known vocabulary, e.g., a request to insert or delete a record
- '+' (plus) server is sending a key
- '−' (minus) server is sending a value
- '=' (equals) server is requesting the last result Other text input is either ignored by the TCK device or results in an error. The important sample implementation command vocabulary is:

Plain Channel Accessible "Star" Commands
*I insert a new record.
*X delete a record
*? inquire about existence of a key (on same line)
*@ inquire about the content of the record's value
*S inquire about status FIG. 5 illustrates an exemplary embodiment 150, in which the device is configured to perform record-specific access codes for deleting a record, reading a key, and reading a value, as well as record-specific limits on the number of incorrect attempts, and limits on the types of value accesses that are permitted (e.g., substring authentication or fingerprint hashes).

Figure 14:
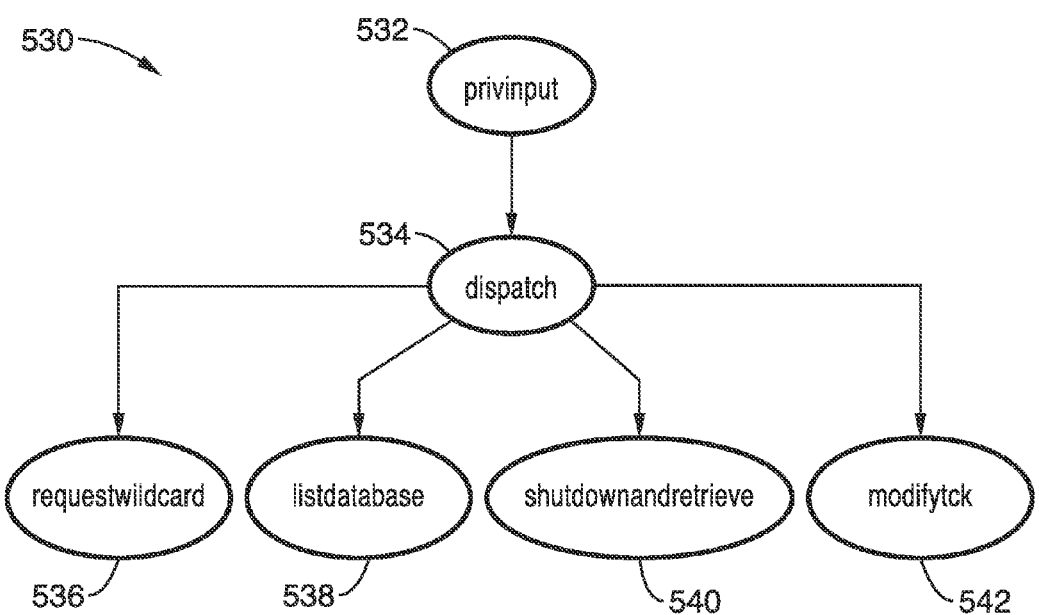
FIG. 14 is a flow diagram of performing privileged requests on the TCK device according to an embodiment of the present disclosure.

A main loop 152 is shown from which both unprivileged 154 and privileged 156 user requests are serviced. An unprivileged user input is obtained 154 from the unprivileged USB channel and dispatched 158 depending on command code with *I commands processed at block 162 for adding a record, *X commands processed at block 164 for deleting a record, *? commands processed at block 166 for checking existence of a record, @? commands processed at block 168 for reading a value (record), and *S commands processed at block 170 for requesting TCK database status. After performing the command processing returns 172 to main loop 152. The TCK device ignores all other (e.g., privileged) user requests over the unprivileged hardware channel. However, over the privileged channel, user requests 156, if they are found to be single channel requests, can be handled the same way as they would 157 over the unprivileged channel. Multiple record access requests can be handled through a privileged command dispatch 160, an example of which is seen in FIG. 14. More simply these multiple record accesses can be serviced through Linux console login on the privileged TCK channel; or through relocation of the TCK storage device to another computer that has full access to the storage and is aware of the internal storage mechanisms used in TCK file storage.

A sample communication session between the server and the device over the unprivileged port may appear as follows:
*I[30] Delcode=5 maxbaddel=20 Keycode=10 Valcode=20 rfp
+user1
−password1 SSN1

The above command lines request inserting a new record for key 'user1' with value 'password1 SSN1' into the database. If the record already exists in the database, it will be overwritten only if its Delcode was 30. Otherwise, the insert attempt fails. If the record was inserted, future accesses will require the codes noted: for deletion, the integer '5' will be required; for key (existence check) access, the integer '10' will be required, for value access, the integer '20' will be required. Finally, the only value access permitted in the future to this record is the reading of the value's fingerprint (i.e. a hash function of 'password1 SSN1'):

*?[50]
+wrongkey
=PRINT

The above lines sent by the server to the TCK device test whether the value 'wrongkey' exists in the data base. If it exists and has keycode 50 (and has not been locked), then the answer will be a positive integer; otherwise it will be 0 (zero) and a bad access attempt will be logged. If 'wrongkey' exists but its keycode was not 50, the return code will still be 0, but the bad key access attempt will be logged also to the specific key "wrongkey." If bad key accesses exceed the maximum number of permissible key access attempts for existing key "wrongkey," then the data base record is locked. In the current implementation, this is permanent. However, it could be temporary.

*@rfp[20]
+user1
=PRINT

The above command lines request the fingerprint of the value for key 'user1'. A fingerprint is a form of checksum. A suitable generic, efficient, and common implementation of the checksum here is the familiar cyclic redundancy check (CRC32) error correction code. If 'user1' exists and has valcode 20 (for allowing value accesses at all, and has not been locked), then the fingerprint crc value of the record will be printed. Again, other bad access attempts are logged and met with a return code of 0. If 'user1' exists but its valcode was not 20 or it had no rfp permission, the bad value access attempt will be logged. If bad access attempts exceed the maximum number of permissible value access attempts, the record is locked.

FIG. 6 through FIG. 10 illustrate example embodiments of executing each of these commands seen in FIG. 5 on the TCK device.

Figure 6:
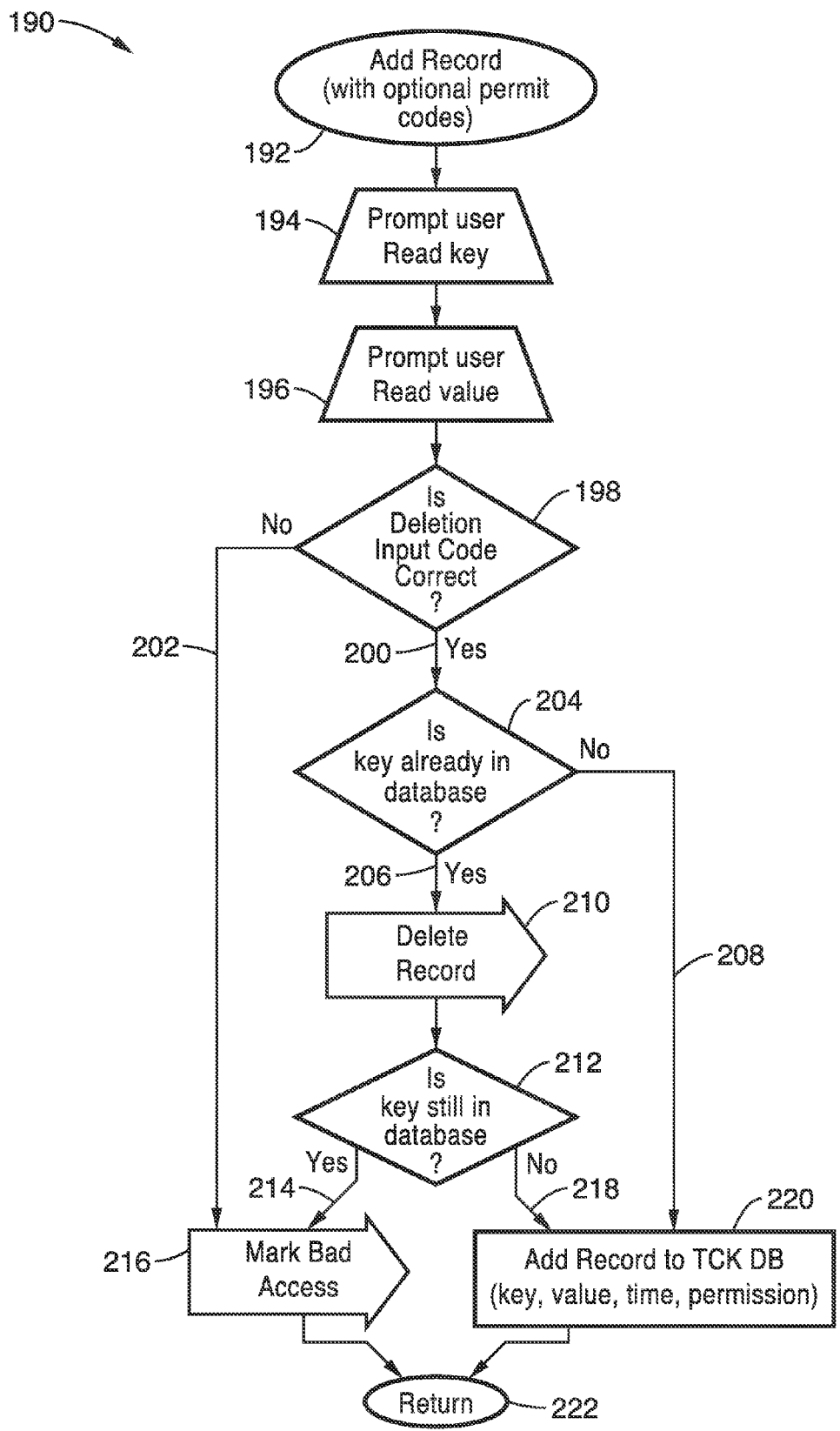
FIG. 6 is a flow diagram of executing an add record request in the TCK device for the unprivileged channel according to an embodiment of the present disclosure.

In FIG. 6 an add record command 190 is executed with optional parameters 192, with a user prompted 194 for a user read key, and prompted for a user read value 196 which are checked 198. If the key and/or value is bad, or permission fails, then execution moves to block 216 marking the access as bad and a return 222 is made. Otherwise, if the key, data, and permissions are valid 200, a check is made if record is already in the database 204. If the key is already in the database 206 then the record is deleted 210, otherwise a record is added 220 to TCK DB. In the current implementation, the TCK device keeps a transaction log, which makes it possible to undo all operations after a specific point in time (e.g., when the server was found to be compromised). In addition, delete requests in this implementation remove a record from the searchable index, thus making it defacto inaccessible, yet do not remove the record contents itself. Then a check is made 212 if the key remains in the database. If the key still remains 214, then an access error is flagged 216 and a return 222 is made. Otherwise, if the deleted record is not found 218, then the record is added 220 to the TCK database with key, value, time and permission. It should be appreciated, that for the sake of simplicity of illustration, the marking of a bad access is depicted in this flow diagram and other flow diagrams herein, without the loading of any sub-error codes, variables, or pointer values, however, one of ordinary skill in the art will appreciate that enhanced error handling can be implemented without departing from the teachings of the present disclosure.

Figure 7:
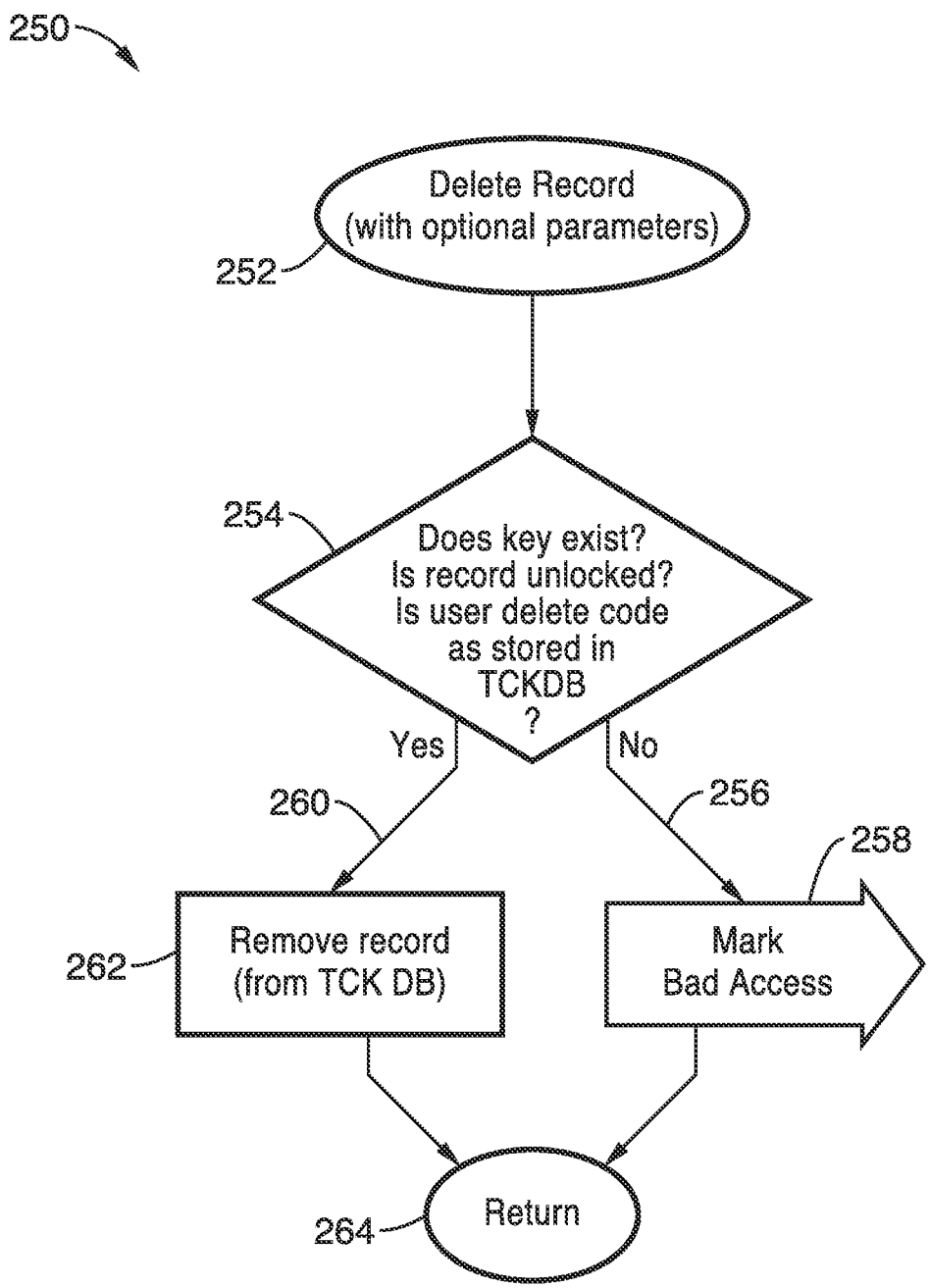
FIG. 7 is a flow diagram of executing a delete record request in the TCK device for the unprivileged channel according to an embodiment of the present disclosure.

In FIG. 7, a delete record command 250 is executed with optional parameters 252. A check is made 254 on the existence of the key, the lock state of the record, and user deletion code. If problems exist with any of these 256, then the access is marked as bad 258 and a return 264 is performed. Otherwise, if the check is positive 260, then the record is removed 262 from the database and a return 264 made.

Figure 8:
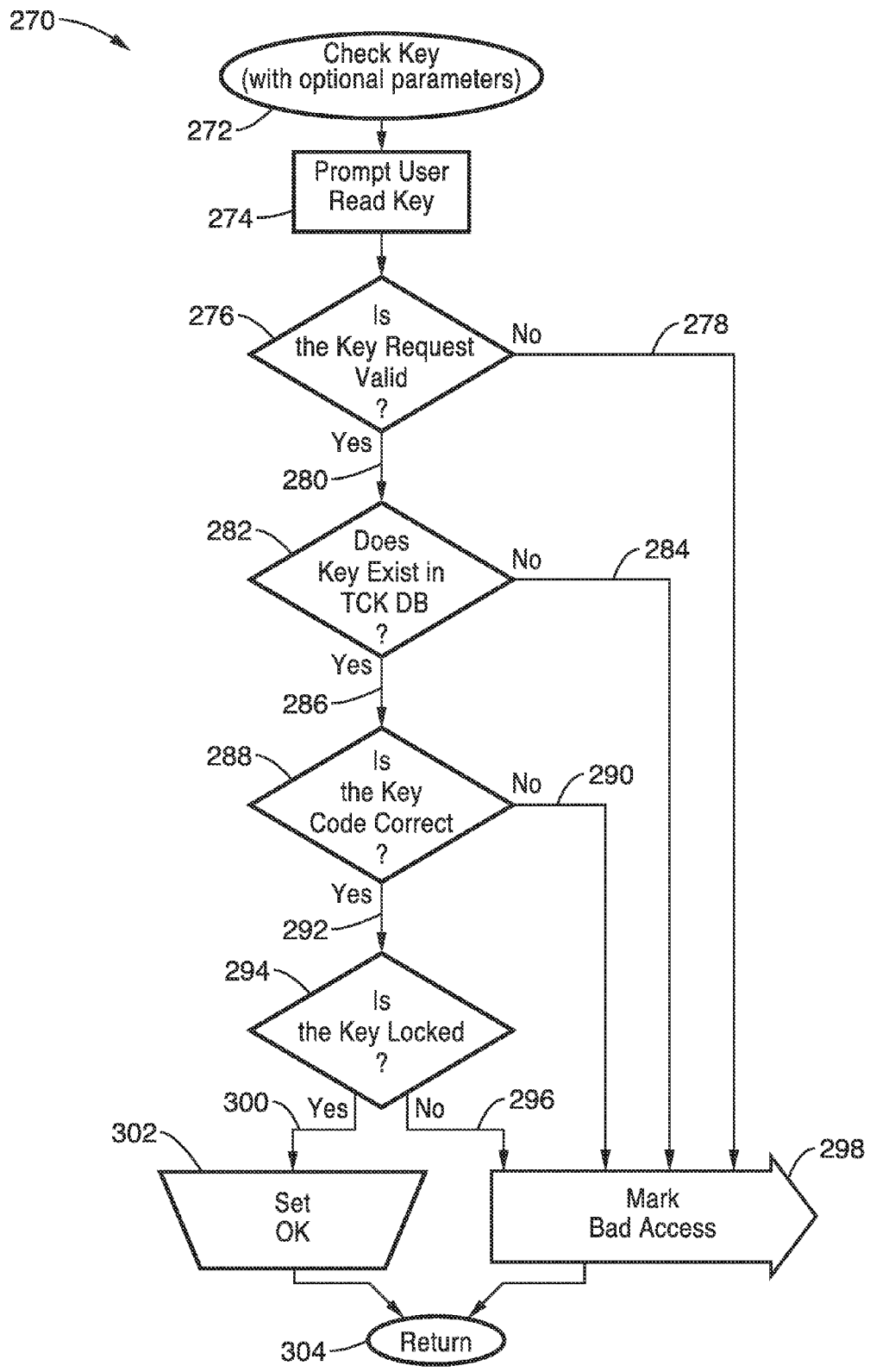
FIG. 8 is a flow diagram of executing a check key request in the TCK device for the unprivileged channel according to an embodiment of the present disclosure.

In FIG. 8, a check key command 270 is executed with optional parameters 272, with the user prompted 274 for a read key, which is checked 276, and if invalid 278 then the access is marked bad 298 and a return performed 304. Otherwise, the key is valid 280 and a check 282 made if the key exists in the database. If the key does not exist 284, then the access is marked bad 298 and a return performed 304. Otherwise, since the key is valid and exists 286, a check 288 is performed to determine if the key code is correct. If the key code is incorrect 290 then the access is marked bad 298 and a return performed 304. Otherwise, the key is valid, exists, and has a correct key code 292, so a check is made 294 if the key is locked. If the key code is locked 300 then a return value is set 302 to OK and a return made 304. Otherwise, with the key code not being locked 296 a bad access value 298 is set and a return performed 304.

Figure 9:
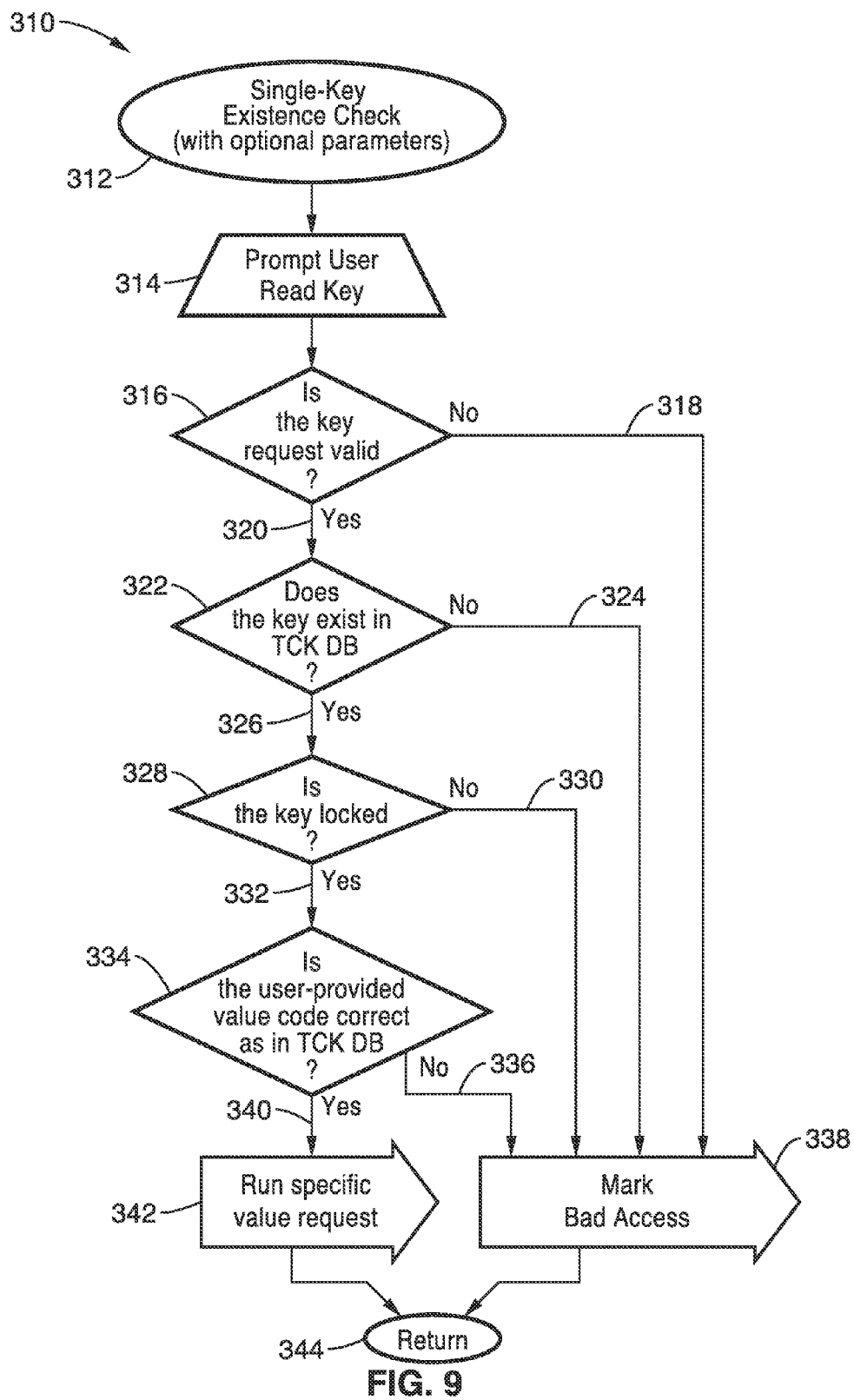
FIG. 9 is a flow diagram of executing a single-key existence check request in the TCK device for the unprivileged channel according to an embodiment of the present disclosure.

In FIG. 9 a single key existence check command 310 is executed with optional parameters 312, with the user prompted 314 for a read key, which is checked 316. If the read key is invalid 318, the access is marked bad 338 and a return performed 344. Otherwise, the key request is valid 320 and a check made 322 if the key exists in the database. If the key does not exist 324, then the access is marked bad 338 and a return performed 344. Otherwise, the valid existing key 326 is checked 328 for being locked. If the key is not locked 330, then the access is marked bad 338 and a return performed 344. Otherwise, the key is also locked 332, and the user-provided value code is checked 334 as in the TCK database. If this value code is incorrect 336, then the access is marked as bad 338 and a return made 344. Otherwise, if the user value code is correct 340, then a specific value request is performed 342 and a return made 344.

Figure 10:
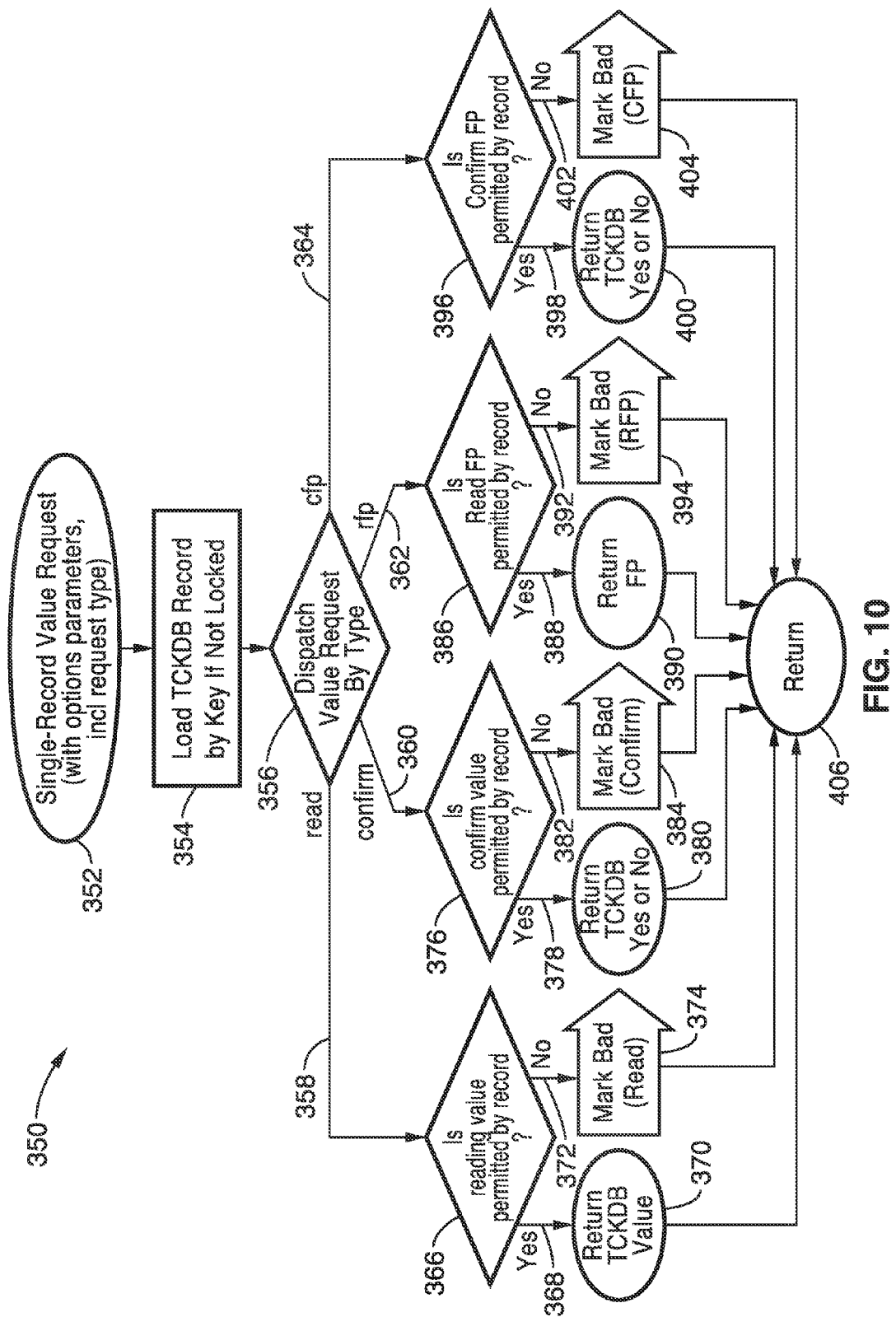
FIG. 10 is a flow diagram of executing a single-record value request in the TCK device for the unprivileged channel according to an embodiment of the present disclosure.

In FIG. 10, an embodiment 350 is presented, where a single record value request 352 is executed with optional parameters, such as including request type. The record is loaded 354 by key if it is not locked. Then the request is dispatched 356 by type, including: read 358, confirm 360, read (return) fingerprint (FP) 362, and confirm fingerprint (FP) 364.

For a read request 358, a check is made 366 if the reading value is permitted by the record. If the read is not permitted 372, then the read is marked as bad 374 and a return made 406. Otherwise the read is good 368 and the TCK database returns the single record value 370 and returns 406.

For a confirm request 360, a check is made 376 if the confirm value is permitted by the record. If the confirm value is not permitted 382, then the confirm request is marked as bad 384 and a return made 406. Otherwise the confirm request is good 378 and the TCK database returns a value (e.g., yes or no) 380 in reply to the confirmation and returns 406.

For a read FP (rfp) request 362, a check is made 386 if the read FP is permitted by the record. If the read FP is not permitted 392, then the read FP request is marked as bad 394 and a return made 406. Otherwise the read FP request is acceptable 388 and the TCK database returns FP 390 in reply and returns 406.

Finally, for a confirm FP (cfp) request 364, a check is made 396 if the confirm FP is permitted by the record. If the confirm FP is not permitted 402, then the confirm FP request is marked as bad 404 and a return made 406. Otherwise the confirm FP request is acceptable 398 and the TCK database returns a yes or no value 400, and returns 406.

Figure 11:
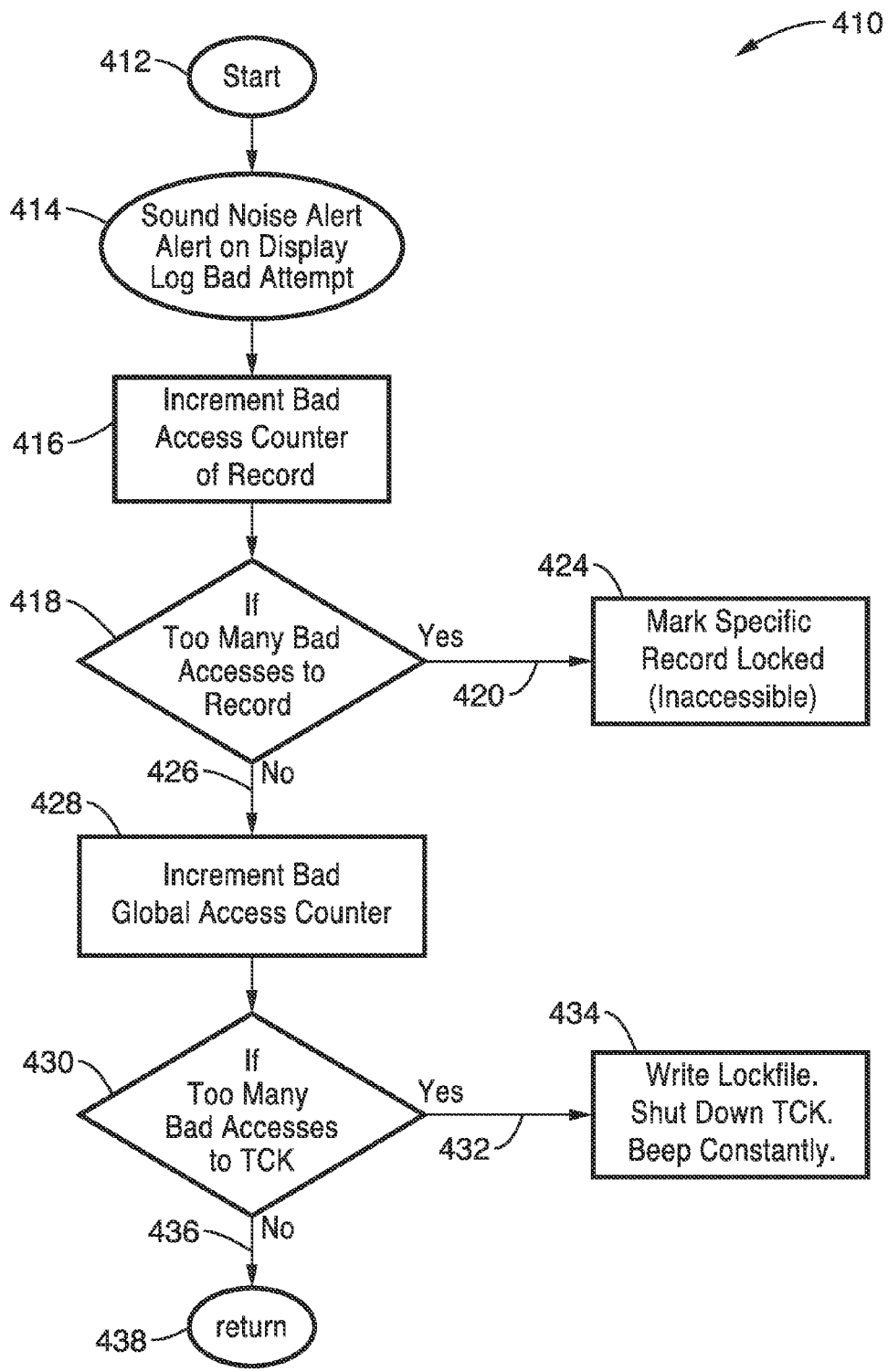
FIG. 11 is a flow diagram of handling bad accesses on the unprivileged channel by the TCK device according to an embodiment of the present disclosure.

FIG. 11 illustrates an example embodiment 410 of the TCK device handling a bad access requests in maintaining system security. The bad access routine starts 412 and generates an alert 414, such as generating a noise alert and indicating an alert on the display, along with the logging of a bad access attempt. A bad access counter value is incremented 416 for a given record, and a check made 418 for an excessive number of bad accesses to this record (e.g., exceeds a fixed threshold or a rolling threshold such as determined by a number of bad attempts per period of time). If it is determined that too many bad access attempts have been made 420 to this record, then the specific record is locked 424 and thus made inaccessible. Otherwise, if there has not been too many bad accesses 426 to this particular record, then a global (i.e., across the records in the DB) bad access counter is incremented 428, and a check made 430 for excessive global bad accesses. If too many of these global bad accesses are made 432 to the database as a whole, then further access to the TCK itself is prevented 434, such as by setting a lockfile flag, shutting down the TCK, and generating a constant alert, such as preferably by audio and display indication. If there has not been excessive bad accesses 436 to a record, or globally, then a return 438 is made.

Figure 12:
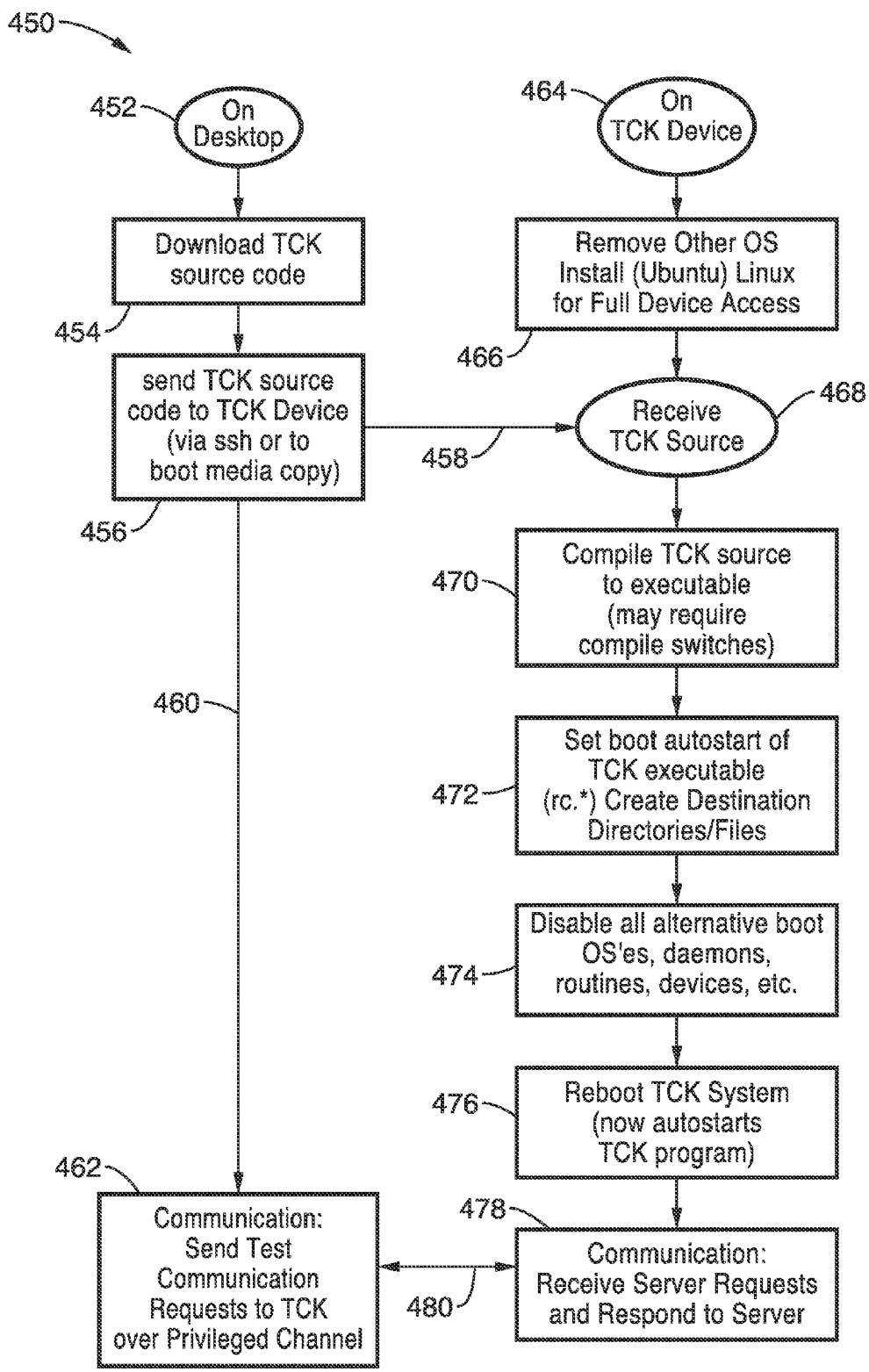
FIG. 12 is a flow diagram of configuring and testing a general purpose computer as a TCK device according to an embodiment of the present disclosure.

FIG. 12 illustrates another example embodiment 450 for configuring a general purpose computing device (e.g., standalone computer, electronic board or card containing a processor, embedded computing device) as the TCK device, and has more details than found in FIG. 3. On the TCK device itself 464, the stock OS is removed and a more familiar configurable OS, such as Ubuntu Linux, is installed 466 for full device access. On a desktop computer system 452, the TCK source code is downloaded 454. Then the TCK source code is sent 456 from the desktop through a communication link (e.g., ssh or to the boot media copy) 458 to be received 468 as TCK source code on the TCK device, then processing continues 460 on the desktop. On the TCK device, this TCK source file is compiled 470 to an executable, and boot is set for autostart 472 of the TCK executable, after which all alternative OS booting is disabled 474, as well as associated daemons, services and routines. The TCK system is then rebooted to autostart the TCK program 476, and a communication test 478 performed between 480 the desktop 462 and the TCK device, in which the desktop as server sends a request, to which the TCK device responds.

Figure 13:
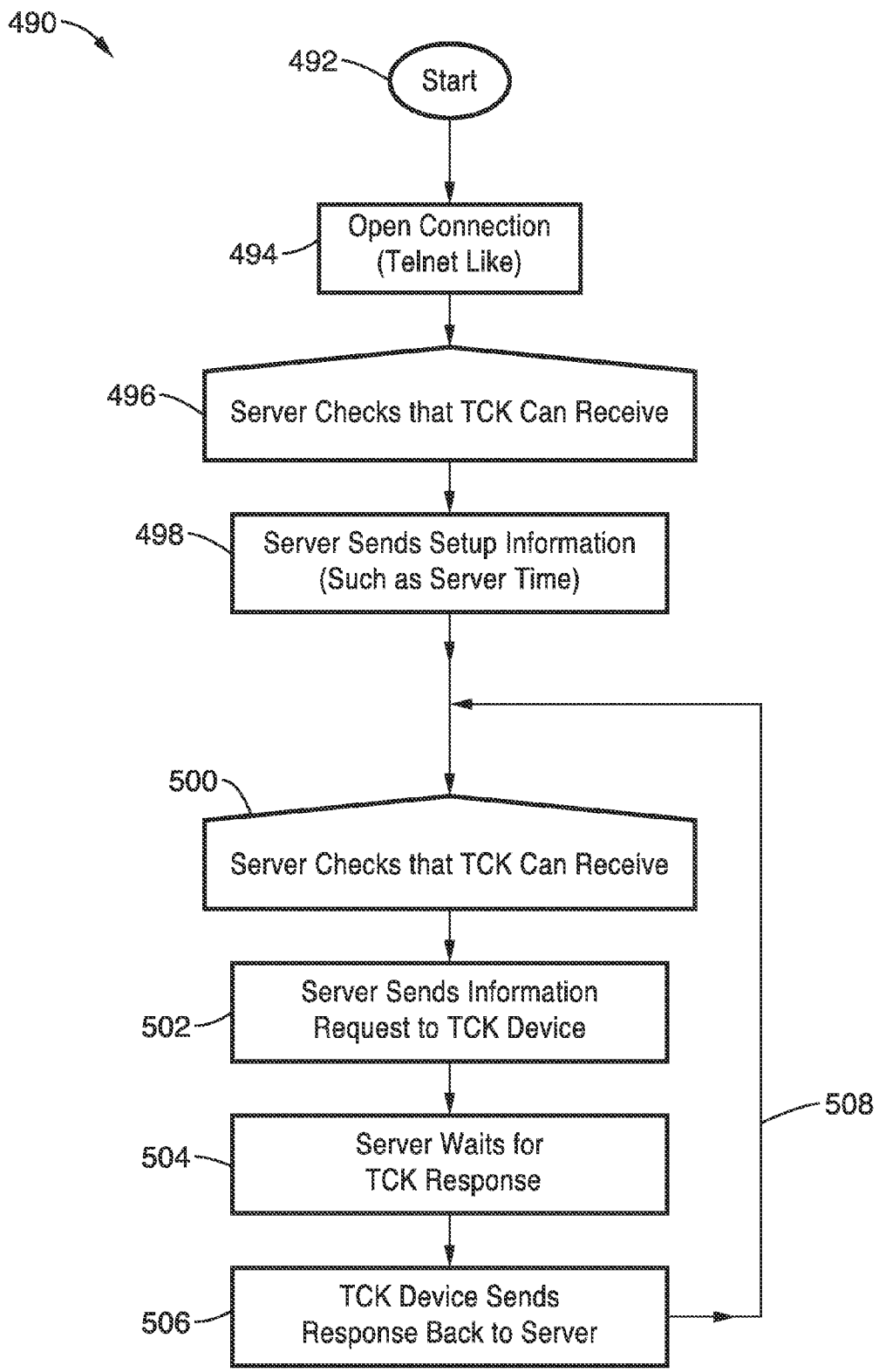
FIG. 13 is a flow diagram of interaction between a server and the TCK device according to an embodiment of the present disclosure.

FIG. 13 illustrates an example embodiment 490 of interaction between the server and the TCK device from the perspective of the server. Server communication is started 492 with a connection to the TCK device is opened 494, such as by using a telnet or similar protocol. The server checks that the TCK can receive its transmissions 496, and then sends setup information 498 to the TCK device, such as including server time. Once the communication is initialized, then the operational phase (loop) is entered in which the server checks 500 that TCK can receive, and then sends a request 502 to the TCK device, waits 504 for TCK response, and receives the response 506 from the TCK, after which return is made 508 to begin the next command from server to TCK.

FIG. 14 illustrates an example embodiment 530 of performing privileged operations on the database contents. A privileged input request is received 532 and dispatched 534 for any of the command types: request wild card 536, list database 538, shut down and retrieve 540, and modify TCK 542.

It will be appreciated that the privileged input channel can be executed in one of three ways. First, privileged access can operate over the TCK program (e.g., TCKrunner-BBB program) when it has been compiled so as to allow further privileged commands. This can be referred to as a "privileged TCKrunner-BBB" version. The privileged version can understand additional extra commands requested of it, such as requests to display a listing of keys. It is this privileged version of the TCKrunner-BBB program, which is generally seen in the flowchart. As an extra security precaution, even if the TCK administrator accidentally runs the TCK superuser version of the TCK control software, so that the possibly compromised superuser of the Internet server could request a listing of all keys, the listing would still not be echoed back to the Internet server but only echoed back to a console display. Thus, it would be invisible to the Internet server. The answer is only visible to the physically present administrator looking at the console display on the TCK device.

Secondly, the privileged channel as previously described can be accessed using the TCK-attached console. This form of access provides the full unrestricted access that modern computers make available to their users, such as copying operations for all their files, directory operations to view files, and execution of arbitrary computer programming code. Thus, console access can provide full control over all storage in the TCK database. Again, without physical access, it is impossible for a remote user to intercept these actions; and it is difficult for the TCK administrator to compromise the channel accidentally.

Third, privileged access can be provided in response to relocation of the database storage medium to a different computer system or device configured for accessing the database storage medium. As with the other two mechanisms, accidental compromise by the server administrator is less likely. The removed storage medium is clearly a high-value asset that should not be relocated to a computer that may have been compromised. An ideal computer to access the data medium would never have been connected to the Internet in the first place.

On the privileged channel, it is simple for a physically present administrator to view the contents of the TCK data base. On the unprivileged channel, it is impossible for a superuser of the Internet server to view these contents. And it is outright difficult for a physically present administrator to accidentally open access to the TCK database to the superuser of the Internet server.

The following describes some additional elements of at least one embodiment of the present disclosure which retains the database on a removable storage device which can be disconnected from the TCK device, such as utilizing an SD card. For administrative privileged channel access, the computer device customized as the TCK device (e.g., Beaglebone prototype) offers the three aforementioned facilities. First, it can run the privileged version of the TCKrunner-BBB. Second, the Beaglebone has the facilities to connect an HDMI monitor and a keyboard, which in effect can serve as a console. This console can provide both full administrative privileged TCK console access to the data and display log/security alerts. Importantly, this console has no further connectivity, especially not to the Internet. Third, it allows the removable storage device (e.g., an SD card) to be removed and the database can then be accessed without limitations on another general-purpose computer that has never been previously connected to the Internet. In the future, additional mechanisms (e.g., special-purpose incompatible hardware connectors) can be utilized to make it more difficult to inspect the SD storage on ordinary computers. Such a mechanism may make it even more difficult for administrators to accidentally connect the removable storage device to a computer that is, has ever been, or will ever be, Internet connected.

To increase access speed or database size, multiple storage devices can be deployed, possibly even in different locations. Servers can either duplicate their data to be stored on multiple devices (some in distant locations for faster access by other servers), or choose different devices depending on keys; for example all records beginning with the letter 'A' can be stored on the first device, and so forth.

Because the device allows for full access over its administrative privileged channel (e.g., such as by the removal of the SD card storage), it is possible to write additional programming to manipulate or synchronize the data. If the administrative privileged channels are provided through a separate non-Internet connected computer, such computers can even communicate with one another over secure channels, such as private modems. However, anytime the TCK data is exposed to a network of multiple computers, it poses a greater risk of inadvertent release of information to the Internet.

It will also be appreciated that the computer readable media (memory) in these TCK device embodiments is "non-transitory," which comprises any and all forms of computer-readable media, with the sole exception being a transitory, propagating signal.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein it will be appreciated that an object of this technology is to create a low-cost low-complexity solution to the Internet security problem that can be implemented and maintained by a system administrator with lower expertise, lower effort, lower accident rates, and lower cost, when compared to currently available alternatives. The technology is intended to help protect even a fully-breached Internet-server against large-scale identity theft, yet still be useful under ordinary circumstances, and still allow the database owner to conduct full and proper maintenance and backup when needed.

From the description herein, it will be appreciated that that the present disclosure encompasses multiple embodiments which include, but are not limited to, the following:

1. An apparatus for securing a database accessed through an Internet-facing server, comprising: (a) a controller device having at least one processor, at least one memory associated with said processor, and programming retained in said memory and configured for execution on said processor; (b) a database retained in said at least one memory, said database containing a plurality of separate records, wherein each record is identified by a unique key and wherein each key is associated with one or more non-unique values; (c) at least one non-privileged communication channel/port on said controller device, said non-privileged communication channel/port configured for connection to at least one Internet-facing server from which requests are received for data from said database; (d) at least one separate privileged communication channel/port on said controller device, said privileged communication channel/port providing local control of the database, typically requiring physical presence, and providing no connectivity to the Internet or to the Internet-facing server; (e) wherein said programming executable on said processor is configured for performing steps comprising: (i) distinguishing between database access requests received from said unprivileged communication channel/port and said privileged communication channel/port; (ii) serving only single-record information from said database over said unprivileged communication channel/port, thereby preventing access to multiple record reads, writes, deletions, additions, or other multiple record activity; and (iii) allowing extended accesses through said privileged communication channel/port which encompass an ability to perform multiple-record operations, and operations required for maintenance of said database.

2. The apparatus of any preceding embodiment, wherein said programming executable on said processor is configured to separate unprivileged and privileged accesses and to prevent an Internet-facing server coupled to said unprivileged communication channel/port from accessing said privileged communication channel.

3. The apparatus of any preceding embodiment: wherein said controller device cannot be connected to the Internet; and wherein the apparatus cannot comprise a software-only implementation on an Internet connected server.

4. The apparatus of any preceding embodiment, wherein said programming executable on said processor is configured for said serving of single-record information while preventing browsing of database information, including preventing browsing of keys and performing wildcard retrievals for said unprivileged communication channel.

5. The apparatus of any preceding embodiment, wherein said programming executable on said processor is further configured so that a correct key for a record must be presented, and is verified by the programming, before a single-record request is serviced for said unprivileged communication channel.

6. The apparatus of any preceding embodiment, wherein said programming executable on said processor is configured to service single-record requests without allowing a requesting device to obtain a listing of stored database keys for said unprivileged communication channel.

7. The apparatus of any preceding embodiment, wherein said programming executable on said processor is configured to service single-record requests without direct or indirect read access to more than one record at a time for said unprivileged communication channel.

8. The apparatus of any preceding embodiment, wherein said programming executable on said processor is configured to service single-record requests without allowing requests from this server, or another Internet facing server, to log into the apparatus for executing computer programs.

9. The apparatus of any preceding embodiment, wherein said unprivileged communication channel/port comprises a high-availability, high-speed communication channel.

10. The apparatus of any preceding embodiment, wherein said unprivileged communication channel/port comprises USB, Ethernet, Intel Thunderbolt, or PCI, connectivity configured for connection to said at least one Internet server, configured as an Internet-facing server.

11. The apparatus of any preceding embodiment, wherein said privileged communication channel/port is configured for being accessed from console access, or in response to removal of at least a portion of said memory which contains said database, and making a physical connection with a computer device configured for accessing said database.

12. The apparatus of any preceding embodiment, wherein said privileged communication channel/port comprises a wired connection to a private network that has no Internet communication.

13. The apparatus of any preceding embodiment, wherein said wired connection comprises an Ethernet connection.

14. The apparatus of any preceding embodiment, wherein said programming executable on said processor is configured for performing extended accesses through said privileged communication channel/port selected from a group of access requests consisting of retrieval and/or listings of stored keys and values, multiple-record accesses, wild card requests, and an ability to execute other computer programs besides controller device programming.

15. The apparatus of any preceding embodiment, wherein said programming executable on said processor is configured for recognizing a command line protocol.

16. The apparatus of any preceding embodiment, wherein said command line protocol comprises at least five commands.

17. The apparatus of any preceding embodiment, wherein said memory associated with said processor, is selected from a group of memory devices consisting of fixed memory, removable memory, non-volatile memory, solid state disks, memory sticks, memory cards, removable media, and combinations thereof.

18. The apparatus of any preceding embodiment, wherein said programming executable on said processor is configured for accessing said database without utilizing encryption keys that are susceptible to interception and loss, thereafter rendering data in said database unusable.

19. The apparatus of any preceding embodiment, wherein said programming executable on said processor is configured for gaining back complete access to database keys and values by an administrator through said privileged communication channel.

20. The apparatus of any preceding embodiment, wherein said programming executable on said processor is configured for switching said database into a read-only mode or a write-only mode by requests performed through said privileged communication channel.

21. The apparatus of any preceding embodiment, wherein said programming executable on said processor is configured for detecting that a limit in number of failed access attempts for a specific record has been reached, and responding to these failed access attempts by generating an alert and/or locking the specific record from further access attempts.

22. The apparatus of any preceding embodiment, wherein said programming executable on said processor is configured for detecting that a limit in number of failed access attempts across multiple records, including global accesses across said database, has been reached, and responding by generating an alert and locking said database to prevent further access attempts until an administrator services said database over said privileged communication channel.

23. A system for securing a database accessed through an Internet-facing server, comprising: (a) at least one Internet facing server configured for receiving database access requests from an Internet; (b) a controller device having at least one processor, at least one memory associated with said processor, and programming retained in said memory and configured for execution on said processor; (c) a database retained in said at least one memory, said database having a plurality of separate records, wherein each record is identified by a unique key and wherein each key is associated with one or more non-unique values; (d) at least one non-privileged communication channel/port on said controller device, said non-privileged communication channel/port configured for connection to said Internet-facing server from which requests are received for data from said database; (e) at least one separate privileged communication channel/port, on said controller device, said privileged communication channel/port providing local control of said database and providing no connectivity to the Internet, or the Internet-facing server; (f) wherein said programming executable on said processor is configured for performing steps comprising: (i) distinguishing between database access requests received from said unprivileged communication channel/port and said privileged communication channel/port; (ii) serving only single-record information from said database over said unprivileged communication channel/port, thereby preventing access to multiple record reads, writes, deletions, additions, or other multiple record activity; and (iii) allowing extended accesses through said privileged communication channel/port which encompass an ability to perform multiple-record operations, and operations required for maintenance of said database.

24. A method of securing a database accessed through an Internet-facing server, comprising: (a) maintaining a database containing a plurality of separate records on a controller device having at least one processor, at least one memory associated with said processor, and programming retained in said memory and configured for execution on said processor; (b) identifying each of a plurality of separate records on said database by a unique key, with each key associated with one or more non-unique values; (c) receiving non-privileged command requests on said controller device over at least one non-privileged communication channel/port configured for connection to at least one Internet-facing server from which requests are received for data from said database; (d) receiving privileged command requests on said controller device over at least one privileged communication channel/port, which is separate from said non-privileged communication channel/port, wherein execution of said privileged command requests provide local control of the database while providing no connectivity to the Internet, or the Internet-facing server; (e) distinguishing between database access requests received from said unprivileged communication channel/port and said privileged communication channel/port; (f) serving only single-record information from said database over said unprivileged communication channel/port, thereby preventing access to multiple record reads, writes, deletions, additions, or other multiple record activity; and (g) allowing extended accesses through said privileged communication channel/port which encompass an ability to perform multiple-record operations, and wild card operations required for maintenance of said database.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for." No claim element herein is to be construed as a "step plus function" element unless the element is expressly recited using the phrase "step for."

What is claimed is:

1. An apparatus for securing a database accessed through an Internet-facing server computer, comprising:
   (a) a controller device having at least one processor, at least one memory associated with said processor, and programming retained in said memory and configured for execution on said processor, said controller device being plugged into said Internet-facing server computer,
   (b) a database retained in said at least one memory, said database containing a plurality of separate records, wherein each record is identified by a unique key and wherein each key is associated with one or more non-unique values;
   (c) one unprivileged communication channel/port on said controller device, said unprivileged communication channel/port configured for connection to said Internet-facing server computer, said Internet-facing server computer connected to the Internet such that requests for data from said database are received, from across the Internet via said unprivileged communication channel/port, by said controller device; and
   (d) one separate privileged communication channel/port on said controller device, said privileged communication channel/port providing local control of the database, said privileged communication channel/port configured for connection to said Internet-facing server computer, said Internet-facing server computer connected to the Internet in such a way that said privileged communication channel/port is not connected to the Internet and is not reachable from across the Internet via said Internet-facing server computer;
   (e) wherein said programming executable on said processor is configured for performing steps comprising:
      (i) distinguishing between database access requests received via said unprivileged communication channel/port and said privileged communication channel/port, and preventing access to said privileged communication channel/port from across the Internet via said Internet-facing server computer connected to said unprivileged communication channel/port;
      (ii) serving only single-record information from said database over said unprivileged communication channel/port, thereby preventing access to multiple record reads, writes, deletions, additions, or other multiple record activity; and
      (iii) allowing extended accesses through said privileged communication channel/port which encompass an ability to perform multiple-record operations, and operations required for maintenance of said database.

2. The apparatus recited in claim 1:
   wherein said controller device cannot be connected to the Internet; and
   wherein the apparatus cannot comprise a software-only implementation on an Internet connected server.

3. The apparatus recited in claim 1, wherein said programming executable on said processor is configured for said serving of single-record information while preventing browsing of database information, including preventing browsing of keys and performing wildcard retrievals for said unprivileged communication channel.

4. The apparatus recited in claim 1, wherein said programming executable on said processor is further configured so that a correct key for a record must be presented, and is verified by the programming, before a single record request is serviced for said unprivileged communication channel.

5. The apparatus recited in claim 4, wherein said programming executable on said processor is configured to service single-record requests without allowing a requesting device to obtain a listing of stored database keys for said unprivileged communication channel.

6. The apparatus recited in claim 4, wherein said programming executable on said processor is configured to service single-record requests without direct or indirect read access to more than one record at a time for said unprivileged communication channel.

7. The apparatus recited in claim 4, wherein said programming executable on said processor is configured to service single-record requests without allowing requests from said Internet-facing server computer, or another Internet facing server, to log into the apparatus for executing computer programs.

8. The apparatus recited in claim 1, wherein said unprivileged communication channel/port comprises a high-availability, high-speed communication channel.

9. The apparatus recited in claim 1, wherein said unprivileged communication channel/port comprises USB, Ethernet, Intel Thunderbolt, or PCI, connectivity configured for connection to said Internet-facing server computer.

10. The apparatus recited in claim 1, wherein said privileged communication channel/port is configured for being physically connected to a computer device that is not connected to the Internet, and said controller device is able to be removed from said Internet-facing server computer and plugged into the computer device, said computer device configured for accessing said database.

11. The apparatus recited in claim 1, wherein said privileged communication channel/port comprises a wired connection to a private network that has no Internet communication.

12. The apparatus recited in claim 11, wherein said wired connection comprises an Ethernet connection or a USB connection.

13. The apparatus recited in claim 1, wherein said programming executable on said processor is configured for performing extended accesses through said privileged communication channel/port selected from a group of access requests consisting of retrieval and/or listings of stored keys and values, multiple-record accesses, wild card requests, and an ability to execute other computer programs besides controller device programming.

14. The apparatus recited in claim 1, wherein said programming executable on said processor is configured for recognizing a command line protocol.

15. The apparatus recited in claim 14, wherein said command line protocol comprises at least five commands.

16. The apparatus recited in claim 1, wherein said memory associated with said processor, is selected from a group of memory devices consisting of fixed memory, removable memory, non-volatile memory, solid state disks, memory sticks, memory cards, removable media, and combinations thereof.

17. The apparatus recited in claim 1, wherein said programming executable on said processor is configured for accessing said database without utilizing encryption keys that are susceptible to interception and loss, thereafter rendering data in said database unusable.

18. The apparatus recited in claim 1, wherein said programming executable on said processor is configured for gaining back complete access to database keys and values by an administrator through said privileged communication channel.

19. The apparatus recited in claim 1, wherein said programming executable on said processor is configured for switching said database into a read-only mode or a write-only mode by requests performed through said privileged communication channel.

20. The apparatus recited in claim 1, wherein said programming executable on said processor is configured for detecting that a limit in number of failed access attempts for a specific record has been reached, and responding to these failed access attempts by generating an alert and/or locking the specific record from further access attempts.

21. The apparatus recited in claim 1, wherein said programming executable on said processor is configured for detecting that a limit in number of failed access attempts across multiple records, including global accesses across said database, has been reached, and responding by generating an alert and locking said database to prevent further access attempts until an administrator services said database over said privileged communication channel.

22. A system for securing a database accessed through an Internet-facing server computer, comprising:
   (a) at least one Internet-facing server computer configured for receiving database access requests from the Internet;
   (b) a controller device having at least one processor, at least one memory associated with said processor, and programming retained in said memory and configured for execution on said processor, said controller device being plugged into said Internet-facing server computer;
   (c) a database retained in said at least one memory, said database having a plurality of separate records, wherein each record is identified by a unique key and wherein each key is associated with one or more non-unique values;
   (d) one unprivileged communication channel/port on said controller device, said unprivileged communication channel/port configured for connection to said Internet-facing server via which requests are received, from across the Internet by said controller device, for data from said database; and
   (e) one separate privileged communication channel/port on said controller device, said privileged communication channel/port providing local control of said database and connected to said Internet-facing server computer, wherein said privileged communication channel/port is not connected to the Internet and is not reachable from across the Internet via said Internet-facing server computer;
   (f) wherein said programming executable on said processor is configured for performing steps comprising:
      (i) distinguishing between database access requests received via said unprivileged communication channel/port and said privileged communication channel/port, and preventing access to said privileged communication channel/port from across the Internet via said Internet-facing server computer connected to said unprivileged communication channel/port;
      (ii) serving only single-record information from said database over said unprivileged communication channel/port, thereby preventing access to multiple record reads, writes, deletions, additions, or other multiple record activity; and
      (iii) allowing extended accesses through said privileged communication channel/port which encompass an ability to perform multiple-record operations, and operations required for maintenance of said database.

\* \* \* \* \*